(12) United States Patent
Ostermann

(10) Patent No.: US 6,838,625 B2
(45) Date of Patent: Jan. 4, 2005

(54) TIPPING BALANCE SCALE FOR WEIGHING MOVING OBJECTS

(76) Inventor: Jerry L. Ostermann, 1155 N. 100th Rd., Sylvan Grove, KS (US) 67481-9305

( * ) Notice: Subject to any disclaimer, the term of this patent is extended or adjusted under 35 U.S.C. 154(b) by 159 days.

(21) Appl. No.: 10/224,257

(22) Filed: Aug. 20, 2002

(65) Prior Publication Data

US 2003/0051925 A1 Mar. 20, 2003

Related U.S. Application Data

(63) Continuation-in-part of application No. 09/933,560, filed on Aug. 20, 2001, now Pat. No. 6,521,847.

(51) Int. Cl.[7] .............................................. G01G 19/00
(52) U.S. Cl. ................................................... 177/145
(58) Field of Search ......................... 177/145, 154–159, 177/256–259, 202, 255, 151–153, 201, 164

(56) References Cited

U.S. PATENT DOCUMENTS

| 103,478 A | * | 5/1870 | Lyman | 177/151 |
|---|---|---|---|---|
| 256,692 A | * | 4/1882 | Hopkins | 177/240 |
| 688,779 A | * | 12/1901 | Harvey | 177/136 |
| 777,011 A | * | 12/1904 | Fairbanks | 177/152 |
| 1,788,580 A | * | 1/1931 | Mandt | 177/145 |
| 1,833,576 A | * | 11/1931 | Jaenichen | 177/151 |
| 2,035,982 A | | 3/1936 | Robinson et al. | 177/255 |
| 2,204,389 A | | 6/1940 | Vater et al. | 177/256 |
| 3,529,686 A | * | 9/1970 | Smith | 177/201 |
| 3,584,503 A | | 6/1971 | Senour | 73/65.06 |
| 3,700,055 A | * | 10/1972 | Gaulier | 177/204 |
| 4,359,099 A | * | 11/1982 | Henslin | 177/140 |
| 4,533,008 A | * | 8/1985 | Ostermann | 177/132 |
| 4,836,304 A | | 6/1989 | Paul | 177/185 |
| 5,856,637 A | | 1/1999 | Vande Berg | 177/145 |
| 5,949,031 A | | 9/1999 | Vande Berg | 177/16 |
| 6,651,821 B2 | * | 11/2003 | Ratesic | 209/592 |

* cited by examiner

Primary Examiner—Randy W. Gibson
(74) Attorney, Agent, or Firm—Shughart, Thomson & Kilroy, P.C.

(57) ABSTRACT

A scale 1 for weighing moving loads 17 includes a weighing platform 3 having an entrance end 5 and an exit end 7. The platform 3 is pivotal about a transverse axis 9 between the entrance end 5 and exit end 7. A first limit stop 13 is engageable to limit downward movement of the entrance end 5 and a second limit stop 15 is engageable to limit downward movement of the exit end 7. A weighing device 11 is connected to the platform 3 and is operable to provide an indication of the weight of a load 17 supported on the platform 3 when neither the first limit stop 13 nor the second limit stop 15 is engaged.

22 Claims, 12 Drawing Sheets

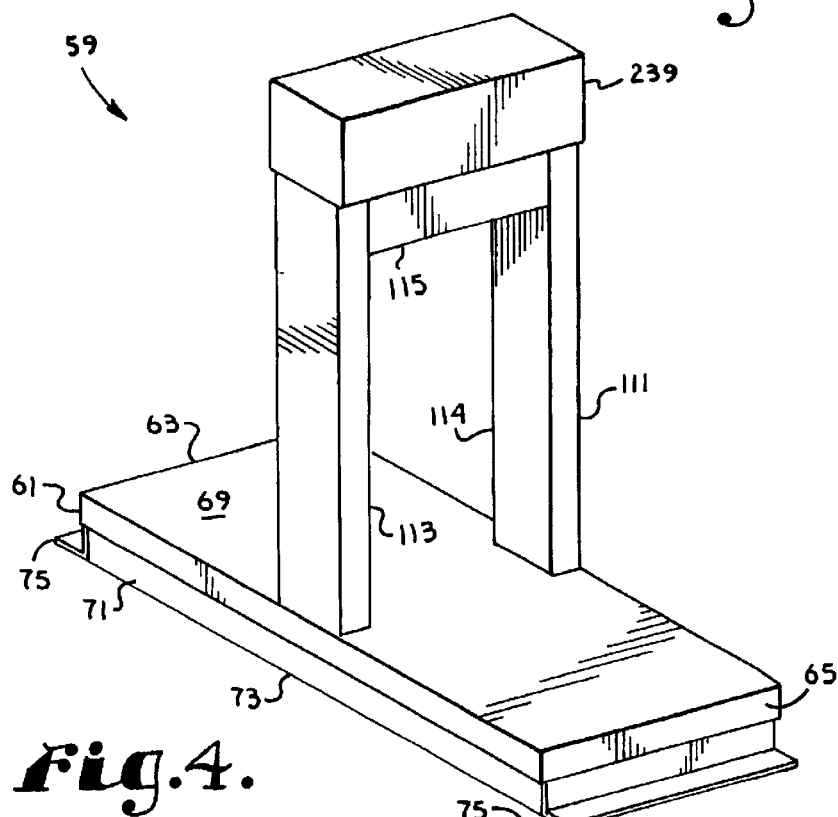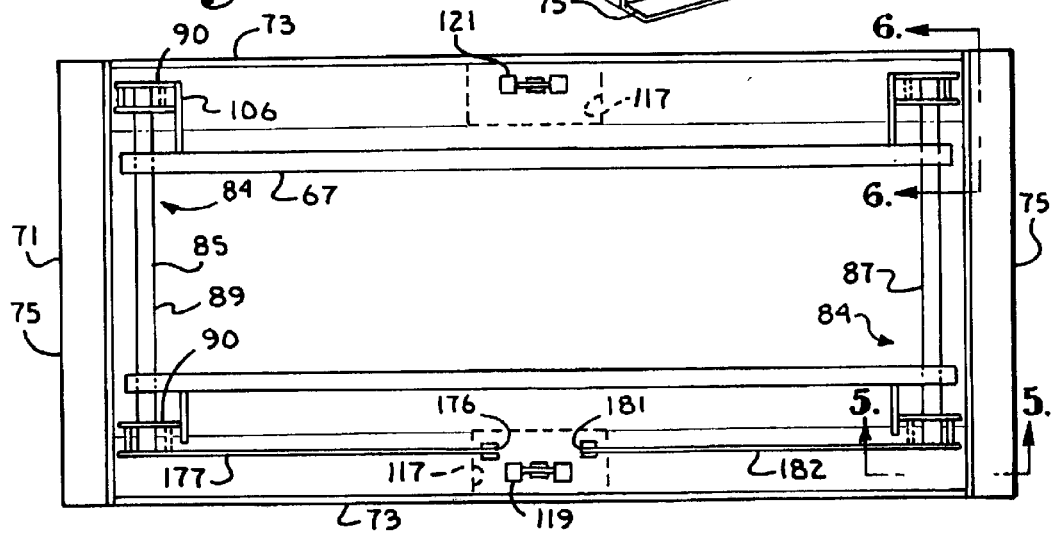

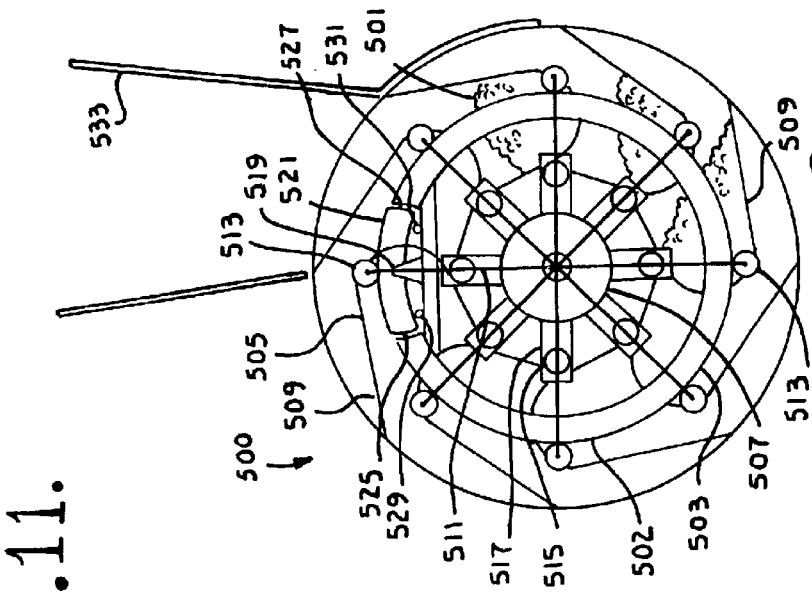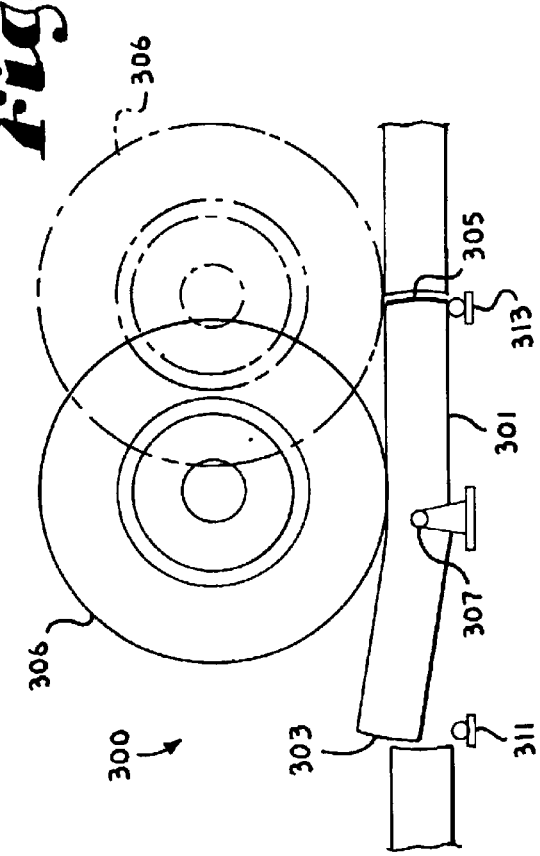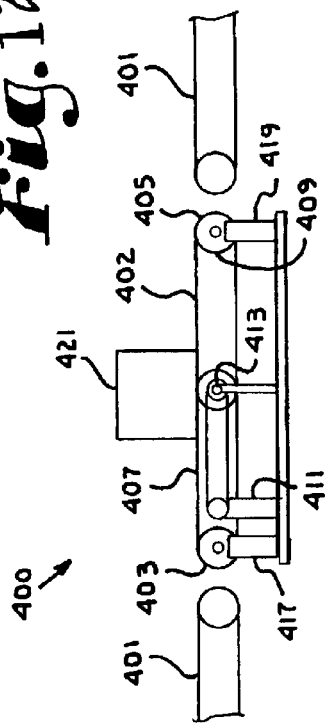

TIPPING BALANCE SCALE FOR WEIGHING MOVING OBJECTS

This application is a continuation-in-part of application Ser. No. 09/933,560 filed Aug. 20, 2001 now U.S. Pat. No. 6,521,847.

BACKGROUND OF THE INVENTION

1. Field of the Invention

The present invention relates to a scale mechanism for weighing either animate or inanimate objects as they are moved across a scale platform.

2. Description of the Related Art

Scales for weighing moving objects such as livestock, wheeled vehicles, or packages moving along a conveyor line generally include a weighing platform across which the object moves as it is being weighed. (As used herein the term "platform" can include a section of rail or track, a tube, or any structure across or through which an item to be weighed can be moved.) The weighing platform is connected to a weighing device such as a spring scale, balance, or load cell for measuring the weight acting on the platform. Prior art scales have attempted to suspend the platform in such a manner that the weighing device can register all of the weight on the platform, no matter where the object is positioned on the platform. Scales of this type have a major disadvantage in that any shock loads acting on the platform are transferred to the weighing device. Shock loads primarily occur when the object is placed on or enters the platform and when the object is removed from the platform. When the load being weighed comprises live animals, shock loads can also occur as the animal moves about on the platform. Shock loads transmitted to the weighing device cause erratic readings to be registered by the weighing device and thereby cause inaccuracy of the weight measurement. Shock loading can also damage the weighing device and lead to its premature failure.

What is needed is a scale mechanism which isolates the weighing device from the majority of shock loads so that accurate weight readings can be obtained.

SUMMARY OF THE INVENTION

The present invention comprises a scale for weighing moving objects in which the weight of the object is gradually transferred onto the weighing device and then gradually transferred off of the weighing device after a weight measurement is taken. The scale drastically reduces shock loading of the weighing device. The scale includes a weighing platform having an entrance end and an exit end. The platform is mounted for pivotal rotation about a transverse axis intermediate the first and second ends. A first limit stop is positioned to limit downward movement of the entrance end of the platform. Similarly, a second limit stop is positioned to limit downward movement of the exit end of the platform. A weighing device is operatively connected to the platform so as to measure weight acting on the platform when neither of the limit stops is engaged.

As a load enters the platform from the entrance end, its weight initially bears on the entrance end and thereby pivots the entrance end downwardly, causing the first limit stop to be engaged. With the first limit stop engaged, a portion of the weight will bear against the first limit stop instead of acting on the weighing device. As the load continues across the platform its weight gradually shifts from the entrance end of the platform to the exit end. As the weight is redistributed, the entrance end begins to pivot upwardly, causing the first limit stop to be disengaged; allowing the weighing device to measure the full weight of the load. As the load continues to move toward the exit end of the platform, a sufficient portion of the weight shifts to said exit end to move the exit end downwardly. Downward movement of the exit end causes the second limit stop to become engaged such that a portion of the weight bears against the second limit stop. The weight of the load is then gradually transferred from the weighing device to the second limit stop until the load exits the platform.

BRIEF DESCRIPTION OF THE DRAWINGS

FIG. 3 is a perspective view of a livestock scale which is an application of the reduced motion concept of FIGS. 2a–2c.

FIG. 4 is a top view of the weighing platform of the scale of FIG. 3 with the decking removed for clarity.

FIG. 11 is a schematic representation of a scale for weighing wheeled loads embodying the concept of FIGS. 1a–1c.

FIG. 12 is a schematic representation of a conveyor scale embodying the concept of FIGS. 1a–1c.

FIG. 13 is a schematic representation of a rotary scale for weighing granular material which incorporates the concept of FIGS. 1a–1c.

DETAILED DESCRIPTION OF THE PREFERRED EMBODIMENTS

I. Introduction

Figure 1A:
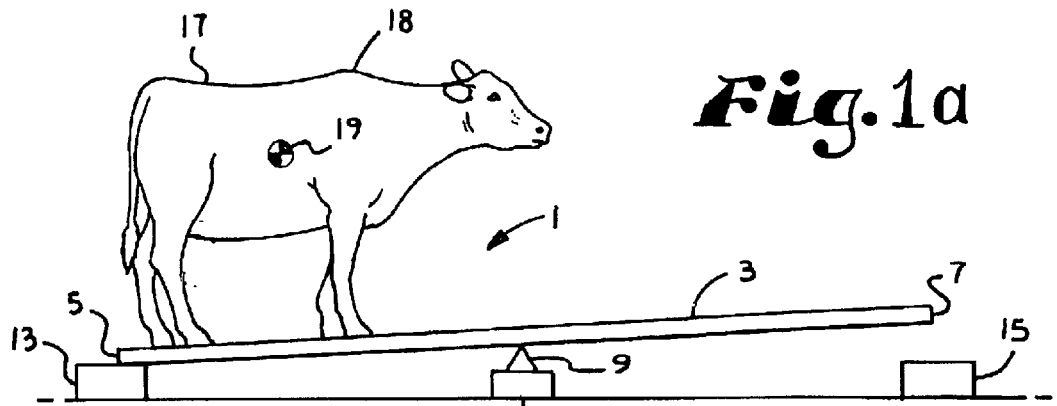
FIGS. 1a–1c are schematic representations of a scale disclosing the basic concept of the present invention and showing the action of the scale as a load moves across the weighing platform.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1B:
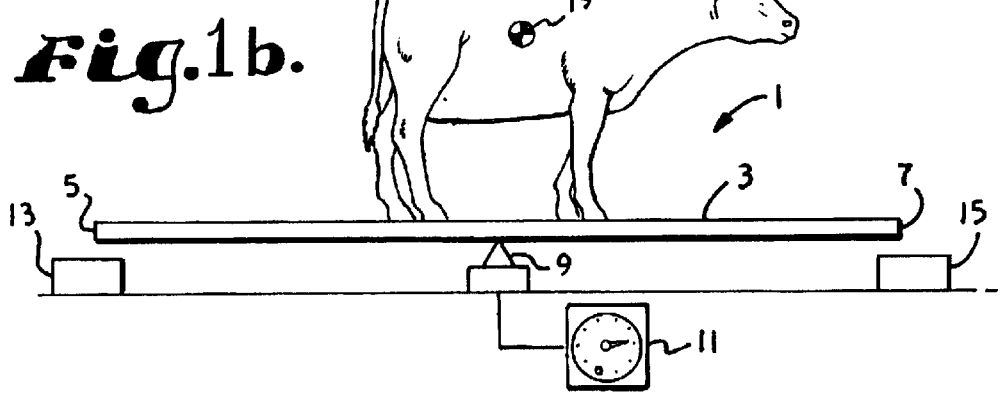
Figure 1C:
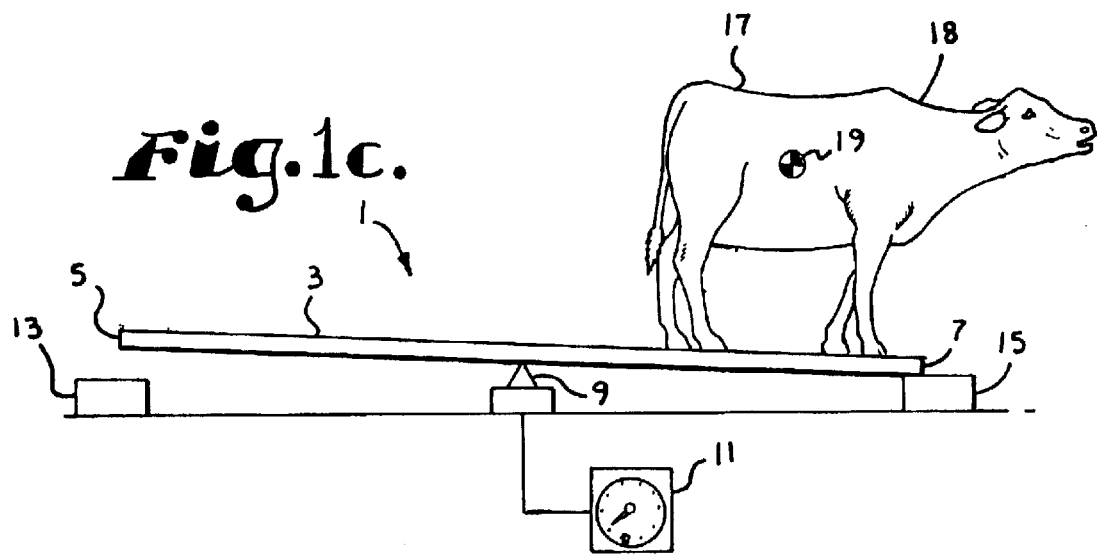

Referring to the drawings in more detail, FIGS. 1a–1c schematically depict a simple platform scale 1 which embodies the present invention. The scale 1 includes a platform 3 having an entrance end 5 and an exit end 7. Unlike the platforms of prior art scales, the platform 3 is supported so as to pivot or tip about a fulcrum or fulcrum member 9 which is operatively connected to a weighing device 11. A first limit stop 13 is provided under the entrance end 5 of the platform 3 so as to limit downward movement of the entrance end 5 as the platform 3 tips. Likewise, a second limit stop 15 is provided under the exit end 7 of the platform 3. The scale 1 is designed to measure the weight of a load 17, such as an animal 18, which moves across the platform 3 from the entrance end 5 toward the exit end 7. The load 17 may be either animate or inanimate and includes a center of gravity 19.

Referring to FIG. 1a, as the load 17 enters the platform 3 from the entrance end 5, its weight causes the entrance end 5 to pivot downwardly and to engage the first limit stop 13. At this point, the weight of the load 17 is supported in part by the first limit stop 13 and in part by the fulcrum 9. As the load 17 moves across the platform 3, more of its weight is gradually transferred to the fulcrum 9 and, consequently, to the weighing device 11. As the center of gravity 19 of the load 17 approaches the fulcrum 9, the entrance end 5 of the platform 3 begins to tip upwardly and off of the first limit stop 13, as shown in FIG. 1b. Once the entrance end 5 of the platform 3 has cleared the first limit stop 13, the entire weight of the load 17 is supported by the fulcrum 9, and the weighing device 11 will reflect the weight of the load 17 (once adjusted for the tare weight of the platform 3).

Referring to FIG. 1c, as the load 17 continues to move toward the exit end 7 of the platform 3, the exit end 7 tips downwardly until it engages the second limit stop 15. Once the exit end 7 engages the second limit stop 15, a portion of the weight of the load 17 will be transferred to the second limit stop 15 and the weighing device 11 will no longer accurately reflect the weight of the load 17. The distance traveled by the center of gravity 19 of the load 17 between the time the entrance end 5 of the platform 3 lifts off the first limit stop 13 and the time that the exit end 7 engages the second limit stop 15 defines a "weighing zone" in which the fulcrum 9 bears the entire weight of the load 17 such that the weight can be registered by the weighing device 11. The weight of the load 17 is then gradually transferred from the fulcrum 9 and weighing device 11 to the second limit stop 15 until the load 17 moves off the exit end 7 of the platform 3.

A major advantage of the scale 1 over prior art scales is that the weight of the load 17 is gradually transferred onto and off of the weighing device 11, drastically reducing any shock loads that could affect the accuracy of the device 11. Because the full weight of the load 17 is the highest weight to act on the weighing device 11, the weighing device 11 need only be equipped with means to record the highest weight registered, and this will be the accurate weight of the load 17. Means for recording the highest or peak load registered by the weighing device 11 are well known in the art.

Scales having a platform which acts as a tipping balance member, such as the scale 1 described above, would work effectively in many applications (some of which will be discussed later herein). In other applications, however, significant movement of the platform could be disadvantageous. For example, in livestock scales, the tipping of the platform could startle the animals and make them hesitant to cross the platform. In these applications, the tipping action can be accomplished by a tipping balance member which is separate from the platform, thereby reducing the motion of the platform itself.

Figure 2A:
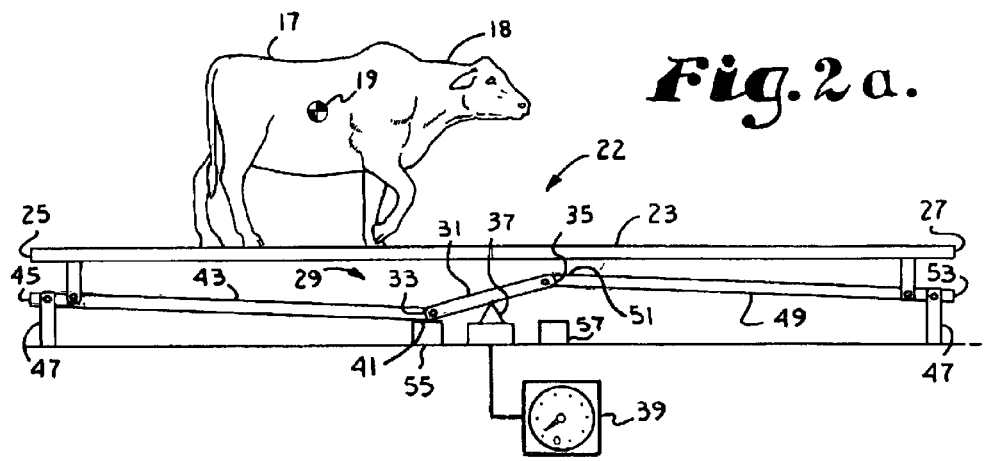
FIGS. 2a–2c are schematic representations of a scale disclosing the concept of a reduced motion version of the scale and showing the action of the scale as a load moves across the weighing platform.
Figure 2B:
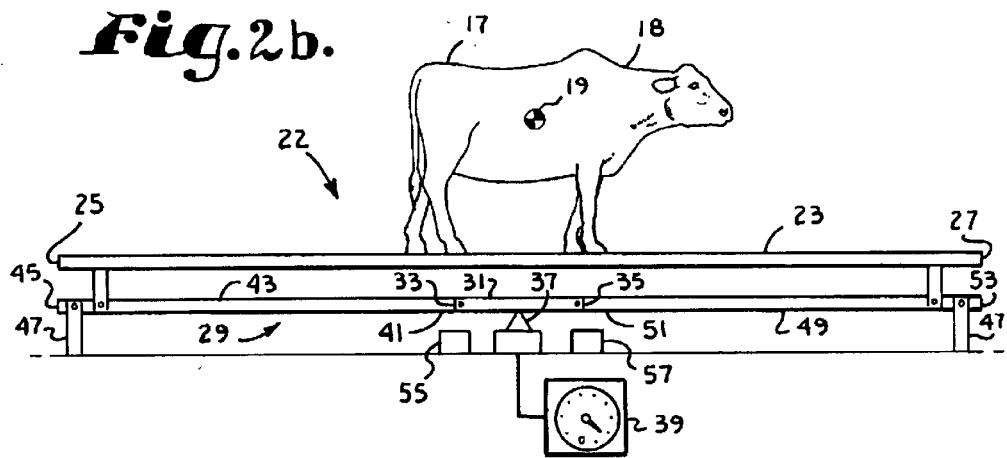
Figure 2C:
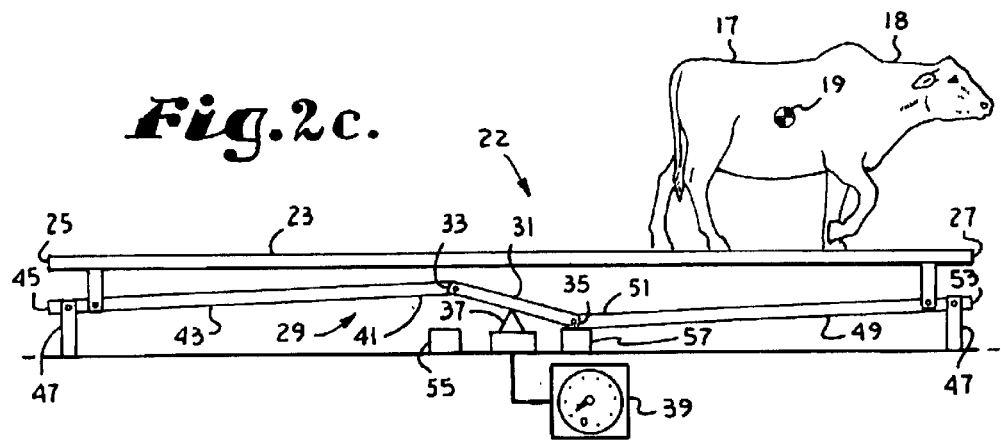

FIGS. 2a–2c schematically depict the concept of a reduced motion scale 22 having a platform 23 with an entrance end 25 and an exit end 27. Positioned beneath the platform 23 is a linkage 29 which includes a tipping balance member 31. The tipping balance member 31 has first and second ends 33 and 35 respectively, and is pivotally supported on a fulcrum 37 intermediate the first end 33 and second end 35. The fulcrum 37 is operatively connected to a weighing device 39. The first end 33 of the tipping balance member 31 is pivotally connected to a first end 41 of a first scale arm 43. The first arm 43 extends from the tipping balance member 31 toward the entrance end 25 of the platform 23, where a second end 45 thereof is pivotally supported on a frame or foundation 47. Similarly, a second scale arm 49 has a first end 51 which is pivotally connected to the second end 35 of the tipping balance member 31. The second arm 49 extends from the tipping balance member 31 toward the exit end 27 of the platform 23, where a second end 53 thereof is pivotally supported on the frame or foundation 47. A first limit stop 55 is positioned under the first end 33 of the tipping balance member 31 to limit downward movement thereof. Similarly, a second limit stop 57 is positioned under the second end 35 of the tipping balance member 31.

The platform 23 is supported by the linkage 29. The entrance end 25 of the platform 23 is pivotally connected to the first arm 43 proximate its second end 45. The exit end of the platform 23 is pivotally connected to the second arm 49 proximate its second end 53.

Referring to FIG. 2a, as the load 17 (which is again depicted as an animal 18) enters the platform 23 from the entrance end 25, its weight pushes downwardly on the first scale arm 43 and causes the first end 41 thereof to pivot downwardly. Downward movement of the first end 41 of the first scale arm 43 causes the first end 33 of the tipping balance member 31 to also pivot downwardly and to engage the first limit stop 55 such that the limit stop 55 supports a portion of the weight of the load 17. As the load 17 moves across the platform 23, an increasing portion of its weight is gradually transferred to the second scale arm 49, and thereby to the second end 35 of the tipping balance member 31. As the center of gravity 19 of the load 17 approaches the fulcrum 37, the first end 33 of the tipping balance member 31 begins to tip upwardly and off of the first limit stop 55, as shown in FIG. 2b. Once the first end 33 of the tipping balance member 31 has cleared the first limit stop 55, the weight of the load 17 is supported in the center by the fulcrum 9 and at the ends by the frame 47. With the load 17 so positioned, the weight acting through the fulcrum 37 on the weighing device 39 will be a fixed percentage of the weight of the load 17 and the tare weight of the platform 23, which can easily be adjusted to reflect the actual weight of the load 17.

Referring to FIG. 2c, as the load 17 continues to move toward the exit end 27 of the platform 23, an increasing amount of its weight begins to push downwardly on the second scale arm 49, causing the first end 51 thereof to pivot downwardly. Downward movement of the first end 51 of the second scale arm 49 causes the second end 35 of the tipping balance member 31 to also pivot downwardly and to engage the second limit stop 57 such that the limit stop 57 supports a portion of the weight of the load 17. The weighing zone of the scale 22 within which the load 17 may be weighed is the defined by the distance traveled by the center of gravity 19 between the time the first end 33 of the tipping balance member 31 lifts off of the first limit stop 55 and the time that the second end 35 of the tipping balance member 31 contacts the second limit stop 57. The portion of the weight of the load 17 supported by fulcrum 37 and weighing device 39 gradually decreases as the load 17 moves off the exit end 27 of the platform 23.

As with the scale 1, the scale 22 has the advantage of gradually loading and unloading the weighing device 39 and thereby eliminating the transmission of shock loads thereto. In addition, the scale 22 operates with only minimal movement of the platform 23.

II. First Application

FIGS. 3–10 depict a livestock scale 59 which represents an application of the reduced motion concept previously described in conjunction with the scale 22. Referring to FIGS. 3 and 4, the scale 59 includes a platform 61 across which animals (not shown) to be weighed are moved. The platform 61 includes a first end 63 and a second end 65. For ease of explanation, the first end 63 will be designated as an "entrance" end, and the second end 65 will be designated as an "exit" end, however it is to be understood that the direction of movement of the animals is immaterial. The platform 61 generally comprises a pair of longitudinal support members 67, to which flooring or decking 69 is attached. The support members 67 may be formed of steel channel and the decking 69 may be wood, steel plate, or any other suitable material.

The platform 61 is moveably mounted on a frame 71, which generally comprises a boxlike structure having side rails 73 and end rails 75. The side rails 73 are shown as being formed of steel angle stock having a vertical flange 77 and an inwardly pointed horizontal flange 79 (see FIG. 6). The end rails 75 are similarly formed of steel angle stock having a vertical flange 81 and an outwardly oriented horizontal flange 82 (see FIG. 5). A floor plate 83 is fastened to the horizontal flanges 79 and 82 to enclose the underside of the platform 61.

Referring to FIG. 4, The platform 61 is mounted on the frame 71 through a scale mechanism 84 which includes first and second rocker shafts 85 and 87, respectively, which allow the platform 61 to pivot relative to the frame 71. The first rocker shaft 85 is positioned transversely to the frame side rails 73 proximate the entrance end 63 of the platform 61. Similarly, the second rocker shaft 87 is positioned transversely to the side rails 73 proximate the exit end 65 of the platform 61. Each of the rocker shafts 85 and 87 comprises an elongate cylindrical body 89 having pairs of parallel, spaced apart pivot plates 90 connected thereto proximate each end. The pivot plates 90 each extend inwardly and outwardly from the body 89 to inner ends 91 and outer ends 92, respectively. The ends 91 and 92 are rounded so as to have a uniform radius relative to the center of the cylindrical body 89 (see FIG. 5).

Figure 5:
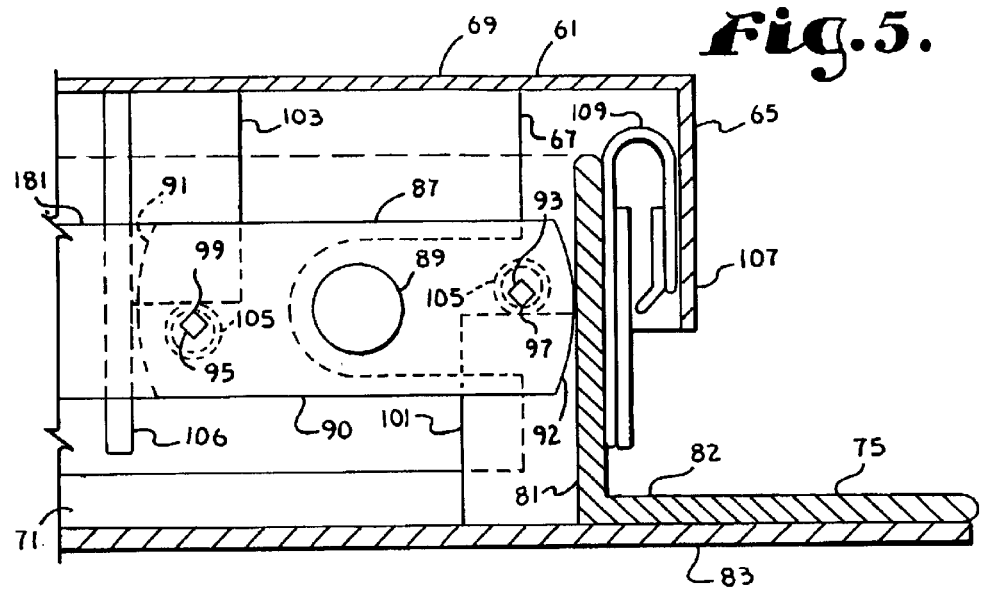
FIG. 5 is a fragmentary cross-sectional view of the scale pivots taken generally along line 5—5 in FIG. 4.
Figure 6:
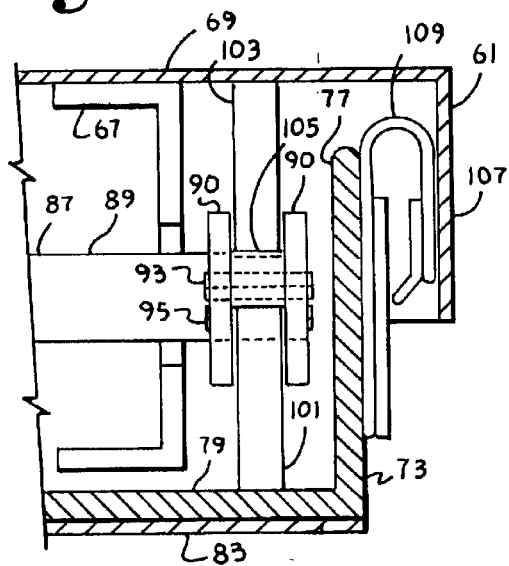
FIG. 6 is a fragmentary cross-sectional view of the scale pivots taken generally along line 6—6 in FIG. 4.

Referring to FIGS. 5 and 6, extending between each pair of pivot plates 90 are first and second scale pivots 93 and 95, respectively. Each of the scale pivots 93 and 95 is formed of hardened steel bar having a generally square cross section. The first scale pivots 93 are oriented such that one corner thereof forms a downwardly pointing knife edge 97. Similarly, the second scale pivots 95 are oriented such that one corner thereof forms an upwardly pointing knife edge 99. The scale pivots 93 and 95 are removably mounted to the pivot plates 90 so as to be easily replaceable, and while removed can be rotated and reinserted such that an unused corner can be moved into the knife edge position to replace a worn knife edge.

Each of the downwardly pointing knife edges 97 of the first scale pivots 93 bears against a lower bearing block 101 fixedly attached to the frame 71. Similarly, each of the upwardly pointing knife edges 99 of the second scale pivots 95 bears against an upper bearing block 103 fixedly attached to the platform 61. Optionally, hardened bushings 105 can be placed around the scale pivots 93 and 95 so as to be interposed between the knife edges 97 and 99 and their respective bearing blocks 101 and 103. The bushings 105 act to protect the softer bearing blocks 101 and 103 from being excessively worn by the knife edges 97 and 99.

In order to keep the rocker shafts 85 and 87 from sliding out of position, the rounded outer ends 92 of the pivot plates 90 are positioned in close proximity to the inner surface of the vertical end rail flanges 81 such that the flanges 81 serve to limit movement of the shafts 85 and 87 in an outward direction. Lateral walls 106 connected to the platform 61 proximate the inner ends 91 of the pivot plates 90 limit movement of the shafts 85 and 87 in an inward direction. The rounded shape of the ends 91 and 92 allows the shafts 85 and 87 to pivot without interference from the walls 106 or flanges 81.

The platform 61 further includes an edge flange 107 which projects downwardly from the platform decking 69 around the outer perimeter thereof. The edge flange 107 overlaps respective upper portions of the frame side rail vertical flanges 77 and end rail vertical flanges 81. Interposed between the platform edge flange 107 and the frame flanges 77 and 81 is a continuous flexible seal 109 which prevents debris and moisture from entering the scale mechanism 84 and interfering with its operation.

As best seen in FIG. 3, midway along the length of the platform 61 is a bridge housing 111 which includes first and second vertical legs 113 and 114, and a cross channel 115. The housing legs 113 and 114 each comprise a tube or conduit of generally rectangular cross section which are fastened to the platform 61 proximate the side edges thereof. The platform 61 includes openings 117 beneath the legs 113 and 114 such that the interior of the legs can communicate with the space beneath the platform 61 (see FIG. 4). The housing cross channel 115 is also of a generally rectangular cross section and is open on its top side. The cross channel 115 is fastened to the legs 113 and 114 at its opposed ends such that its interior communicates with the interior of the legs 113 and 114. Since the bridge housing 111 is connected to the platform 61, its weight becomes part of the tare weight of the scale 59.

As seen in FIGS. 7–10, positioned inside of the bridge housing 111 is a flexible bridge frame structure 118 which includes first and second vertical frame members 119 and 121 positioned inside of the respective first and second housing legs 113 and 114. The vertical frame members 119 and 121 extend through the openings 117 in the platform 61 and are pivotally attached to the frame 71 at their lower ends. The vertical members 119 and 121 are each shown as comprising two lengths of square tubing 123 connected at their lower ends by a plate 125 (see FIGS. 7 and 10). Each plate 125 includes a downwardly facing notch 127. A pair of clevis plates 129 extend upwardly from each side rail horizontal flange 79 below the respective opening 117. A pin 131 extends between each pair of the clevis plates 129. The notches 127 each engage the respective pin 131 so as to allow the respective frame member 119 or 121 to rock both laterally and fore-and-aft relative to the frame 71.

Figure 8:
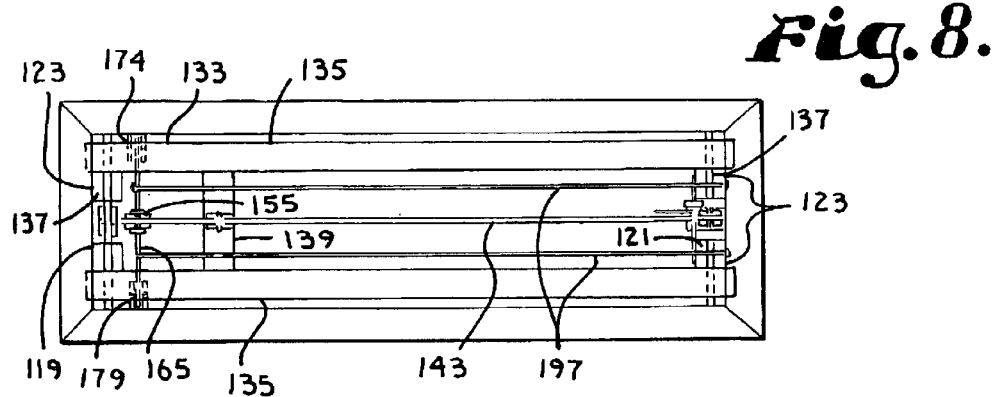
FIG. 8 is a top view of the bridge of the scale of FIG. 3 with portions removed to show the details of the scale mechanism.
Figure 9:
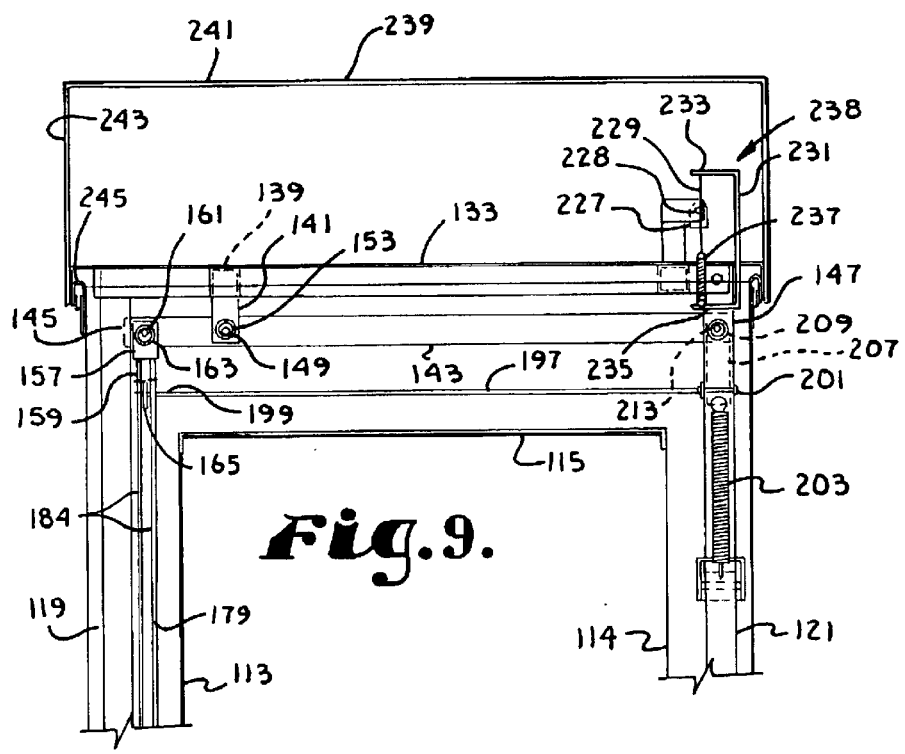
FIG. 9 is a fragmentary end view of the scale of FIG. 3 with portions removed to show the details of the scale mechanism.

As seen in FIGS. 8 and 9, a generally horizontal upper frame member 133 is positioned within the housing cross channel 115 and connects the vertical frame members 119 and 121. The upper frame member 133 is shown as comprising two lengths of square tubing 135 pivotally connected to the frame members 119 and 121 by pins or bolts 137. A cross piece 139 is welded between the lengths of tubing 135 at a point which is intermediate the connection with the first vertical frame member 119 and the midpoint of the upper frame member 133. Extending downwardly from the cross piece 139 are a pair of clevis plates 141 to which a weigh beam 143 is connected.

The weigh beam 143 is positioned within the housing cross channel 115 below the upper frame member 133. The weigh beam 143 has a first end 145 proximate the first vertical frame member 119 and a second end 147 proximate the second vertical frame member 121. The connection between the weigh beam 143 and the clevis plates 141 is preferably made by a hardened pivot pin 149 which extends through the weigh beam 143. The pivot pin 149 has a downwardly oriented knife edge which engages hardened bushings 153 connected to the clevis plates 141. The pivot pin 149 and all similar pivot pins to be discussed herein may be square pins having interchangeable knife edges as previously described in reference to the scale pivots 93 and 95.

Figure 7:
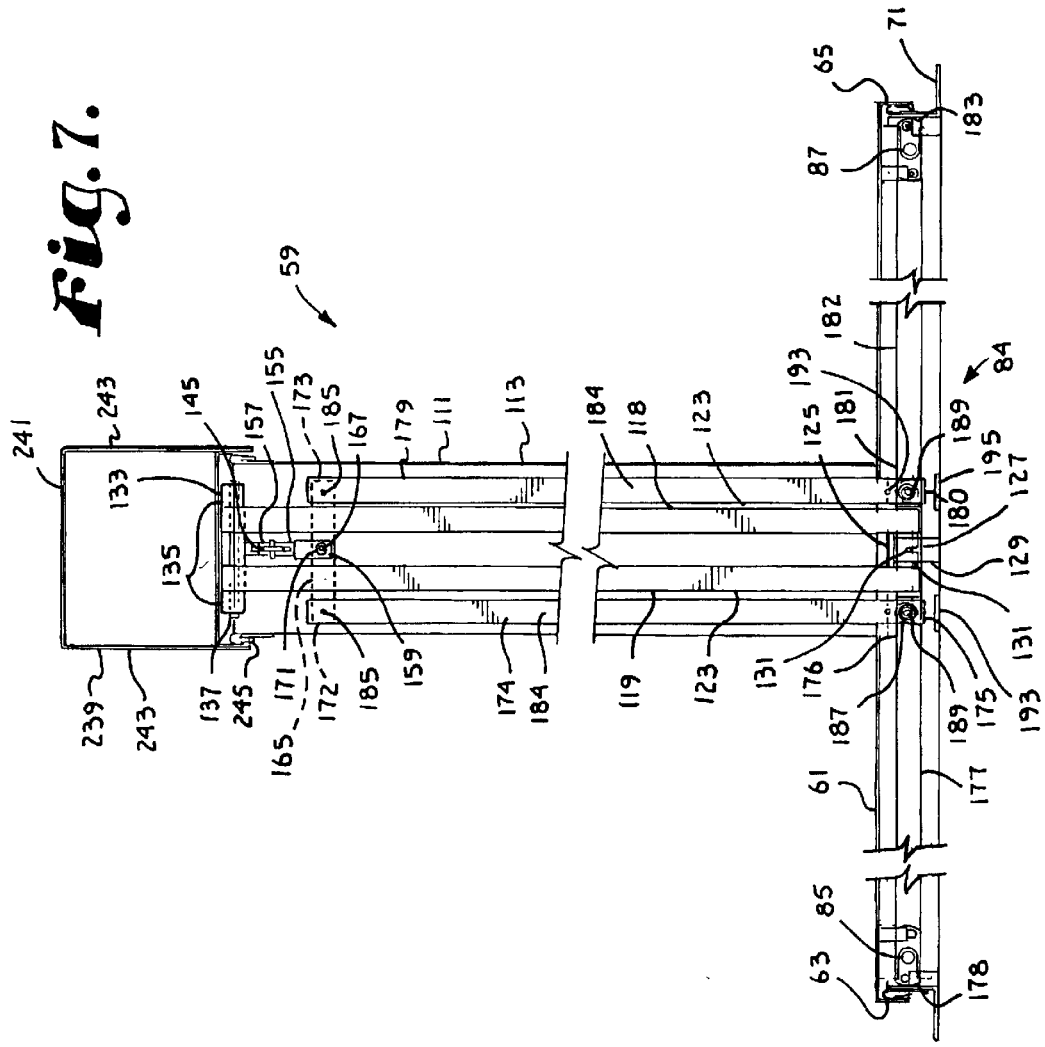
FIG. 7 is a fragmentary left side view of the scale of FIG. 3 with portions removed to show the details of the scale mechanism.

As best seen in FIGS. 7 and 9, attached to the first end 145 of the of the weigh beam 143 and extending downwardly therefrom is a double clevis 155 having a pair of upper clevis plates 157 and a pair of lower clevis plates 159. The lower clevis plates 159 are rotated ninety degrees relative to the upper clevis plates 157. As best seen in FIG. 9, the upper clevis plates 157 pivotally engage a pivot pin 161 which extends through the weigh beam 143. The pivot pin 161 has a upwardly oriented knife edge which engages hardened bushings 163 connected to the clevis plates 157. Pivotally supported by the lower clevis plates 159 is a tipping balance member 165 (see FIG. 7). The connection between the lower clevis plates 159 and the tipping balance member 165 is made by a pivot pin 167 which extends through the tipping balance member 165. The pivot pin 167 serves as a fulcrum about which the tipping balance member 165 pivots. The pivot pin 167 has a downwardly oriented knife edge which engages hardened bushings 171 connected to the clevis plates 159.

The tipping balance member 165 has a first end 172 and a second end 173 which are equally spaced outward from the fulcrum pin 167. Pivotally attached to the first end 172 of the tipping balance member 165 is a first vertical link 174 which extends downwardly from the tipping balance member 165, through the first leg 113 of the bridge housing 111, and through the opening 117 in the platform 61. A lower end 175 of the first vertical link 174 is pivotally connected to a first end 176 of first scale arm 177. The first scale arm 177 extends beneath the platform 61 to a second end 178 thereof which is fixedly connected to the first rocker shaft 85. Similarly, a second vertical link 179 is pivotally attached to the second end 173 of the tipping balance member 165. The second vertical link 179 extends downwardly from the tipping balance member 165 to a lower end 180 which is pivotally connected to a first end 181 of a second scale arm 182. The second scale arm 182 extends beneath the platform 61 to a second end 183 thereof which is fixedly connected to the second rocker shaft 87. It should be noted that the scale arms 177 and 182 may comprise extensions of respective ones of the pivot plates 90 as shown in FIGS. 5 and 7, or they may be separate and distinct members.

The links 174 and 179 are shown in FIGS. 8 and 9 as comprising respective pairs of flat steel straps 184 positioned on each side of the tipping balance member 165. The straps 184 are pivotally connected to the tipping balance member 165 by pins 185 (see FIG. 7). The pins 185 are not shown as having knife edges, however knife edges could be used in order to decrease friction at the joints. Referring to FIG. 7, the lower ends of the straps 184 incorporate hardened bushings 187 which pivotally engage pivot pins 189 having downwardly facing knife edges which extend through the respective scale arms 177 and 182. The straps 184 making up each link 174 or 179 may be interconnected by one or more bolts or pins 193. The tipping balance member 165, vertical links 174 and 179, and the scale arms 177 and 182 all comprise parts of the scale mechanism 84.

Positioned beneath the lower end 175 of the first vertical link 174 on the horizontal flange 79 of the respective frame side rail 73 is a pad of resilient material 193 which serves as a first limit stop for the tipping balance member 165. Similarly, a second pad of resilient material 195 is positioned beneath the lower end 180 of the second vertical link 179 which serves as a second limit stop for the tipping balance member 165. The resilient nature of the pads 193 and 195 serves to reduce noise that would be created if the lower ends 175 and 180 of the links 174 and 179 were to impact a hard surface.

In order to make it possible for an accurate tare weight can be established for the scale 59, it is important that the tipping balance member 165 not rest on either of the limit stops 193 and 195 under no-load conditions. The tipping balance member 165 is urged into a horizontal position when there is no load on the platform 61 by a pair of thin torsion bars 197, as seen in FIGS. 8 and 9. The torsion bars 197 each have a first end 199 which is fixedly attached to the tipping balance member 165. From the first ends 199, the torsion bars 197 extend across the platform 61, through the housing cross channel 115, to a second end 201 which is fixedly attached to the second vertical frame member 121. The bars 197 are of a sufficiently thin diameter that they can flex and provide very little resistance as the weigh beam 143 pivots about the pin 149. The torsional resilience of bars 197, however, is sufficient to move the tipping balance member 165 and the platform 61 into a horizontal position under no-load conditions so that an accurate tare weight can be established.

While dual torsion bars 197 are shown herein, it is to be understood that other means can be used to level the tipping balance member 165 under no load conditions. For example, a single torsion bar 197 could be made integral with the fulcrum pin 167 to achieve the same purpose. Alternatively, a first end of a flat spring (not shown) could be fixedly connected to the tipping balance member 165. A second end of the flat spring and the fulcrum pin 167 would then be pivotally connected to the first vertical frame member 119 through a pair of parallel links (not shown). As with the torsion bars 197 depicted, this arrangement which would allow vertical movement of the first end 145 of the weigh beam 143 while urging the tipping balance member 165 into a horizontal orientation under no load conditions. In yet another embodiment, the tipping balance member 165 could be made generally T-shaped by adding a leg (not shown) extending upwardly or downwardly perpendicular to the tipping balance member 165. Extension springs (not shown) could then be connected between the leg and the first vertical frame member 119 to provide the recommended bias.

Figure 10:
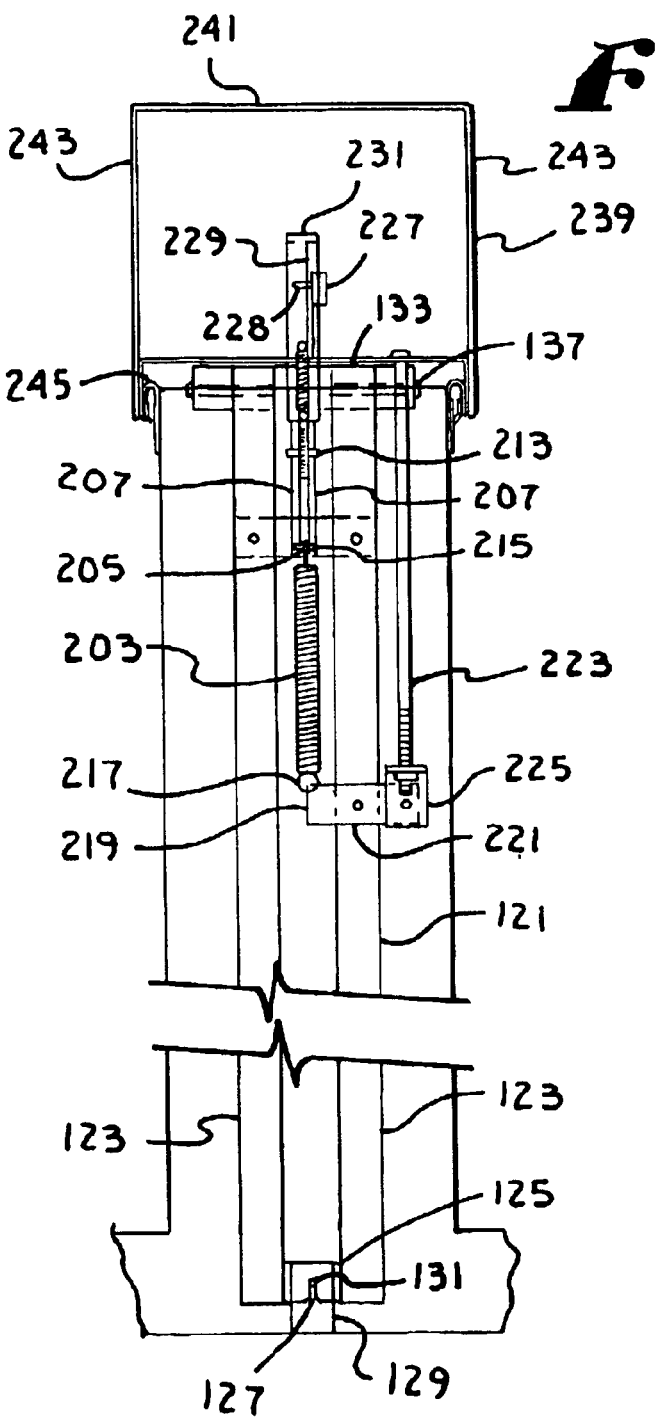
FIG. 10 is a fragmentary right side view of the scale of FIG. 3 with portions removed to show the details of the scale mechanism.

Referring to FIGS. 9 and 10, attached to weigh beam 143 proximate the second end 147 is a scale spring 203 which pulls downwardly on the second end 147 to counter the downward forces acting on the first end 145 of the weigh beam 143. An upper end 205 of the scale spring 203 is connected to the weigh beam 143 by a pair of clevis plates 207. The clevis plates 207 include hardened bushings 209 which pivotally engage an upwardly facing knife edge of a pivot pin 213 extending through the weigh beam 143 proximate the second end 147. A pin 215 extends between the clevis plates 207 and accepts the upper end 205 of the spring 203. A lower end 217 of the spring 203 is connected to a first end 219 of a bracket 221 which is pivotally mounted to the second vertical frame member 121. A tare adjustment bolt 223 is connected between a second end 225 of the bracket 221 and the upper frame member 133. By turning the tare adjustment bolt 223, more or less tension can be put on the scale spring 203, and the scale 59 can thereby be zeroed.

Fixedly mounted on the upper frame member 133 proximate the second end 147 of the weigh beam 143 is a rotary encoder 227 having a rotatable shaft 228. The shaft 228 engages a flexible fiber 229 which is attached to the weigh beam 143 by a C-shaped bracket 231 having an upper leg 233 and a lower leg 235. The fiber 229 is connected between the upper leg 233 and the lower leg 235 of the bracket 231 and tensioned by a spring 237. The lower leg 235 is welded to an upper end of the clevis plates 207 such that the bracket 231 moves up and down with the second end 147 of the weigh beam 143 but the fiber 229 remains in a generally vertical orientation. The fiber 229 is looped around the shaft 228 such that the fiber 229 turns the shaft 228 as the second end 147 of the weigh beam 143 moves upwardly in response to a load on the platform 61. The encoder 227 produces a signal, such as an electrical or optical signal, representative of the number of turns or partial turns of the shaft and sends the signal to a computer or counter (not shown). Since the encoder signal is proportional to the displacement of the second end 147 of the weigh beam 143, and therefore to the weight of a load on the platform 61, the computer or counter can determine the weight of the load based upon the encoder signal.

It should be noted that the weigh beam 143, scale spring 203, encoder 227 and fiber 229 together comprise a weighing device 238 which is described by way of example only, and that various other known weighing devices could be incorporated into the scale 59 in place of the structure described. For example, a load cell (not shown) could be mounted between the clevis 155 and the upper frame member 133, eliminating the need for the weigh beam 143 entirely. Alternatively, the load cell could be mounted at the second end 147 of the weigh beam 143 in place of the encoder 227 and fiber 229. Mechanical devices could also be used to read the weight on the scale platform 61. For example, the second end 147 of the weigh beam 143 could be provided with a needle to point to a weight reading on a graduated scale. A floating marker or "tattle-tale" could be provided to mark the highest level on the scale reached by the needle.

The upper side of the bridge housing 111 is covered by an enclosure 239 which is generally in the form of an inverted box having a top wall 241 and side walls 243. The enclosure 239 is secured to the upper frame member 133 of the flexible bridge frame 118 such that the side walls 243 overlap an upper portion of the housing 111. A continuous elastomeric seal 245 is positioned between the housing 111 and enclosure side walls 243 to prevent debris or moisture from entering the enclosure 239 while allowing relative movement between the bridge housing 111 and the bridge frame 118.

In use, the scale 59 operates on the same principle as the scale 22 previously described. As an animal (not shown) enters the platform 61 from the entrance end 63, its weight initially pushes downwardly on the second scale pivots 95 of the first rocker shaft 85, causing the first end 176 of the first scale arm 177 to pivot downwardly about the respective first scale pivots 93. Downward movement of the first end 176 of the first scale arm 177 pulls downwardly on the first vertical link 174, causing the first end 172 of the tipping balance member 165 to also pivot downwardly. When the first end 172 of the tipping balance member 165 pivots downwardly, the lower end 175 of the first vertical link 174 engages the first limit stop 193 such that the limit stop 193 supports a portion of the weight of the animal.

As the animal moves across the platform 61, an increasing portion of its weight is gradually transferred to the second scale pivots 95 of the second rocker shaft 87. As the animal's center of gravity approaches the plane of the fulcrum pin 167, the portion of its weight acting downwardly on the second scale pivot 95 of the second rocker shaft 87 becomes sufficient to cause the second scale arm 182 to begin to pivot downwardly about its respective first scale pivots 93. As the first end 181 of the second scale arm 182 moves downwardly, the second end 173 of the tipping balance member 165 is also pulled downwardly by the second link 179. Simultaneously, the first end 172 of the tipping balance member 165 moves upwardly, lifting the lower end 175 of the first link 174 off of the first limit stop 193.

Once the lower end 175 of the first link 174 has cleared the first limit stop 193, the weight of the animal is supported by the fulcrum pin 167 and by the lower bearing blocks 101 which support the first scale pivots 93. With the animal so positioned, the weight acting through the fulcrum pin 167 on the weigh beam 143 will be a fixed percentage of the weight of the animal (plus the tare weight of the platform 61). The percentage of the weight acting on the weigh beam 143 is based upon the distance between respective pairs of the first scale pivots 93 and second scale pivots 95, and the distance between the first scale pivots 93 and the pivot pins 189.

The force acting downwardly on the fulcrum pin 167 will pivot the first end 145 of the weigh beam 143 downwardly about the pin 149, causing the second end 147 to move upwardly against the bias of the scale spring 203. As the second end 147 moves upwardly, the fiber 229 turns the shaft 228 of the encoder 227, generating a signal from which the weight of the animal can be determined by the computer or counter.

As the animal continues to move toward the exit end 65 of the platform 61, an increasing amount of its weight pushes downwardly on the second scale arm 182, causing the first end 181 thereof to continue pivoting downwardly until the lower end 180 of the second vertical link 179 engages the second limit stop 195. The portion of the animal's weight supported by fulcrum pin 167 and weighing device 238 gradually decreases until the animal moves off the exit end 65 of the platform 61. After the animal leaves the platform 61, the torsion bars 197 urge the tipping balance member 165 back into a generally horizontal position. This prevents the tipping balance member 165 from resting on either of the stops 193 or 195 while the tare weight of the scale 59 is determined and adjusted for.

III. Other Applications

FIGS. 11–13 schematically depict other applications in which the concept of the tipping balance scale 1 generally described above may be utilized. FIG. 11 depicts a scale 300 for weighing a wheeled load. The scale 300 could be mounted, for example, in a roadbed for weighing vehicles or in a conveyor rail for weighing loads supported from a wheeled conveyor trolley. The scale 300 includes a platform 301 having an entrance end 303 and an exit end 305. The platform 301 is pivotally mounted for rotation about a fulcrum 307 which has a weighing device (not shown) operatively connected thereto. Respective first and second limit stops 311 and 313 are provided for limiting downward movement of the entrance end 303 and exit end 305 of the platform 301. The platform 301 is traversed from the entrance end 303 to the exit end 305 by a wheel 306 supporting a load (not shown). In conveyor applications, the platform 301 could comprise a section of rail.

The platform 301 may be upwardly curved at the ends 303 and 305 so as to provide a smoother transition for the wheel 306 and thereby further decrease shock loading of the weighing device. The curved platform 301 allows the wheel 306 to remain at a constant level throughout its traverse of the platform 301. In tandem axle applications, the length of the platform 301 may be selected so as to allow it to return to a neutral position between the passage of successive wheels.

In use, the weight of the load acting downwardly through the wheel 306 initially pushes downwardly on the entrance end 303 of the platform 301 and thereby pivots the entrance end 303 against the first limit stop 311 such that a portion of the weight bears against the first limit stop 311. As the wheel 306 continues toward the exit end 305 of the platform 301 and approaches the fulcrum 307, the weight of the load is gradually shifted to the fulcrum 307 until the platform 301 pivots off of the first limit stop 311. The weight of the load acting through the wheel 306 may then be measured by the weighing device. As the wheel 306 moves past the fulcrum 307, a sufficient portion of the weight is shifted to the exit end 305 to move the exit end 305 downwardly against the second limit stop 313 such that a portion of the weight bears against the second limit stop 313. The weight of the load is then gradually shifted from the fulcrum 307 to the second limit stop 313 until the wheel 306 exits the platform 301.

FIG. 12 depicts a conveyor scale 400 for use in conjunction with a belt type conveyor line 401. The scale 400 includes a platform 402 having an entrance end 403 and an exit end 405. The platform 402 is equipped with a continuous conveyor belt 407 entrained around rollers 409 and driven by a power source 411. The platform 402 is pivotally mounted for rotation about a fulcrum 413 which has a weighing device (not shown) operatively connected thereto. Respective first and second limit stops 417 and 419 are provided for limiting downward movement of the entrance end 403 and exit end 405 of the platform 402.

In use, successive loads, such as packages or containers 421 are placed on the platform 402 at the entrance end 403 and carried by the conveyor belt 407 toward the exit end 405. The weight of a load 421 initially pushes downwardly on the entrance end 403 of the platform 402 and thereby pivots the entrance end 403 against the first limit stop 417 such that a portion of the weight bears against the first limit stop 417. As the load continues toward the exit end 405 of the platform 402 and approaches the fulcrum 413, the weight of the load 421 is gradually shifted to the fulcrum 413 until the platform 402 pivots off of the first limit stop 417. While the platform 402 is positioned such that no part of the load 421 is supported by the limit stops 417 and 419, the weight of the load 421 may be measured by the weighing device. As the load 421 moves past the fulcrum 413, a sufficient portion of the weight is shifted to the exit end 405 to move the exit end 405 downwardly against the second limit stop 419 such that a portion of the weight bears against the second limit stop 419. The weight of the load 421 is then gradually shifted from the fulcrum 413 to the second limit stop 419 until the load 421 exits the platform 402.

FIG. 13 depicts a rotary scale 500 which may be utilized for weighing granular material 501. The scale 500 includes a fixed circular ring 502 of track 503 about which a plurality of double bucket assemblies 505 rotate on a hub 507. Each double bucket assembly 505 includes a pair of buckets 509 connected by links 511 such that the buckets 509 are positioned on opposite sides of the ring 502 from one another. Each bucket 509 has associated therewith a roller 513 which rides along the outside of the ring 503. Each link 511 is also mounted on rollers 515 which slidably engage radial tracks 517 extending outwardly from the hub 507.

A portion of the track 503 mounted at the top end thereof is separated from the remainder of the ring 503 and pivotally mounted to pivot about a fulcrum 519 and act as a weighing platform and tipping balance member 521. A weighing device (not shown) is operatively connected to the fulcrum 519. The tipping weighing platform 521 has an entrance end 525 and an exit end 527. A first limit stop 529 is positioned under the entrance end 525 to limit downward movement of the entrance end 525. A second limit stop 531 is positioned under the exit end 527 to limit downward movement of the exit end 527.

Granular material 501 is loaded into successive buckets 509 through a chute 533 located at an upper position on the scale 500. The weight of the material 501 causes the hub 507 and attached double bucket assemblies 505 to rotate. As each loaded bucket 509 approaches the bottom of the ring 502, the roller 513 of the opposite bucket 509 comes onto the weighing platform 521, at which point the weight of the loaded bucket pulls the respective double bucket assembly 505 downward along the respective radial track 517 and pivots the entrance end 525 of the weighing platform 521 against the first limit stop 525. As the hub 507 continues to rotate, the roller 513 moves toward the fulcrum 519, gradually shifting the weight of the loaded bucket 509 from the first limit stop 529 to the fulcrum 519 and attached weighing device. When the entrance end 525 lifts off of the first limit stop 529, the weighing device can measure the weight of the loaded bucket 509.

After the weight is measured, the roller 513 continues to move along the weighing platform 521. As the roller 513 moves past the fulcrum 519, the exit end 527 of the weighing platform 521 pivots downwardly and against the second limit stop 531. The weight of the loaded bucket 509 is then gradually transferred from the fulcrum 519 to the second limit stop 531 until the roller 513 moves off of the platform 521. After the loaded bucket 509 is weighed, it begins to move upwardly along the ring 502 and is inverted such that the material 501 is dumped out.

IV. Alternative Embodiments

Figure 14:
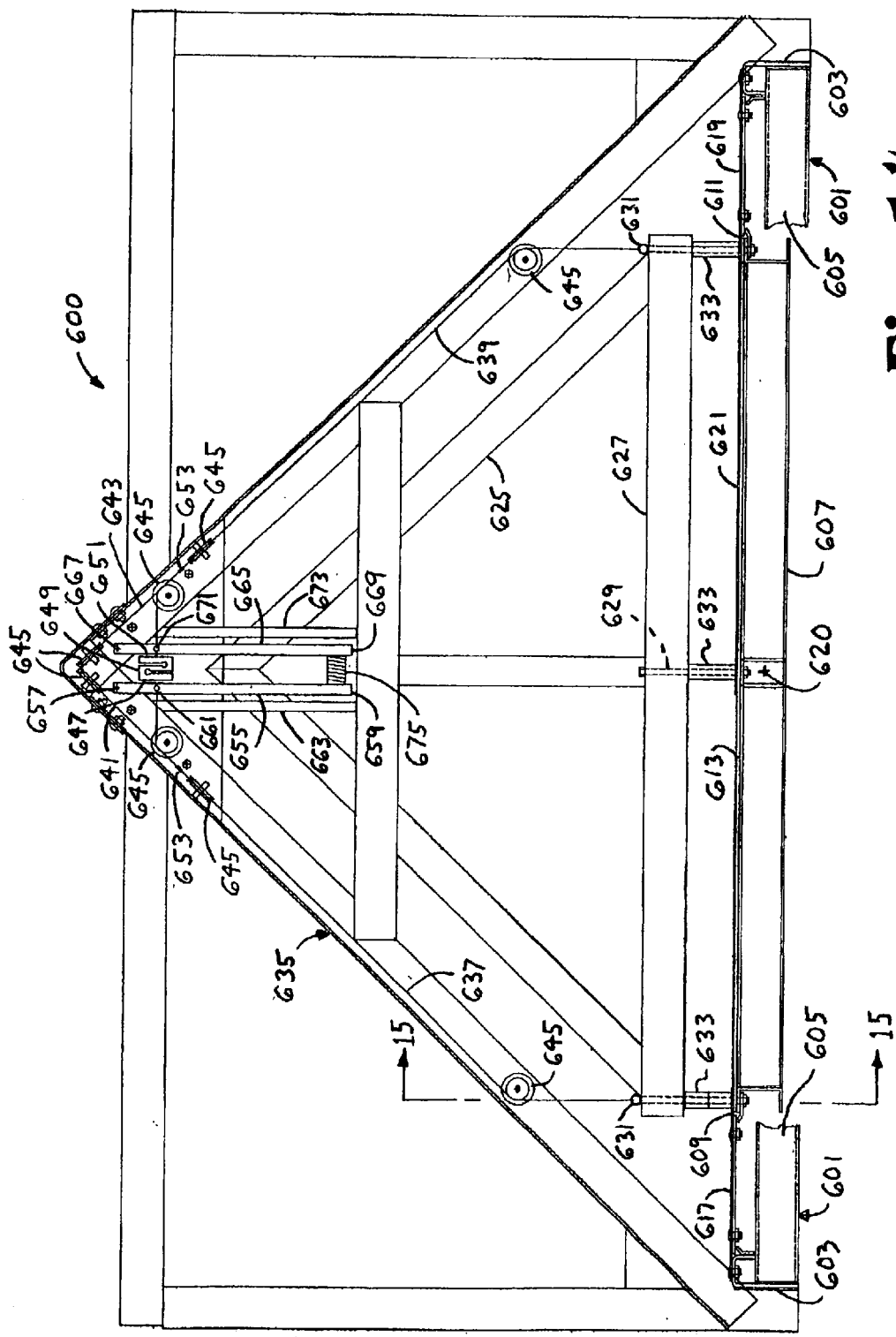
FIG. 14 is a fragmentary front side view of a livestock scale which represents a first alternative embodiment of the present invention.
Figure 15:
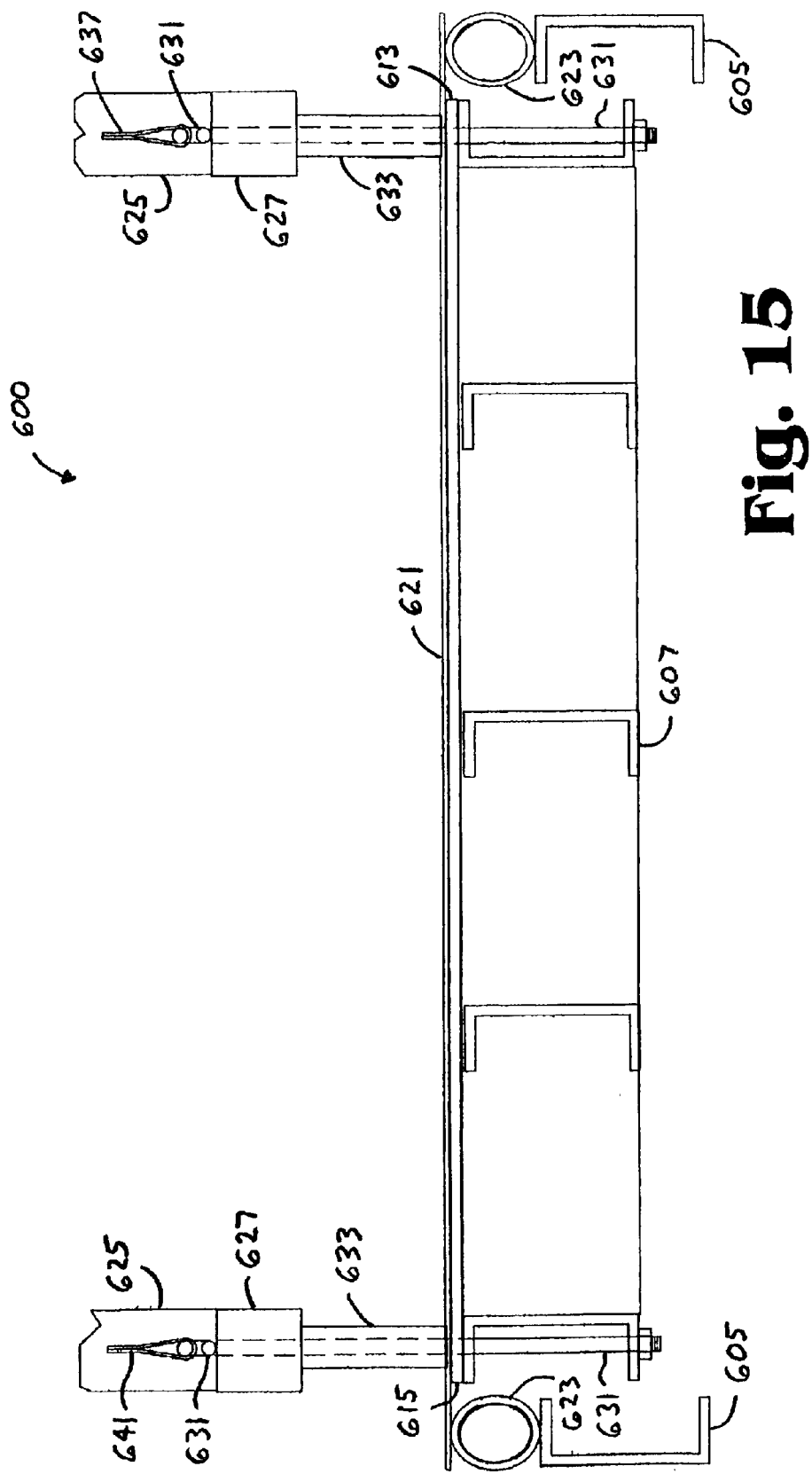
FIG. 15 is a cross sectional view of the platform of the scale of FIG. 14 taken generally along line 15—15 in FIG. 14.

In all of the applications of the tipping balance scale previously described, a weighing device is connected to a fulcrum about which the platform or other tipping member pivots. It is to be understood, however, that an actual fulcrum is not required to practice the present invention. Examples of tipping balance scales without an actual fulcrum to which the weighing device is attached are livestock scales 600 shown in FIGS. 14–15 and livestock scale 700 shown in FIGS. 16–17.

The scale 600 includes a base 601 having opposed end rails 603 and opposed side rails 605. A platform 607 is pivotally connected to the base 601 and includes an entrance end 609, an exit end 611, and opposed front and rear edges 613 and 615, respectively. The entrance end 609 of the platform 607 is hingedly connected to a first platform extension 617, which is, in turn, hingedly connected to one end rail 603 of the base 601. Similarly, the exit end 611 of the platform 607 is hingedly connected to a second platform extension 619, which is, in turn, hingedly connected to the other end rail 603 of the base 601. It should be noted that, although there is no actual fulcrum supporting the platform 607, the platform 607 is pivotable about an axis of rotation 620 generally located midway between the entrance end 609 and the exit end 611 of the platform 607.

A flexible floor plate or covering 621 overlays and is connected to the platform 607, the platform extensions 617 and 619, and the end rails 603 of the base 601. The flexible nature of the floor plate 621 allows it to bend at the joints between the platform 607 and the platform extensions 617 and 619, as well as at the joints between the platform extensions 617 and 619 and the end rails 603. The floor covering 621 preferably has a memory characteristic which causes it to return to a level orientation when the platform 607 is under no load conditions, thereby centering the scale 600. It is to be understood, however, that the scale 600 can be centered in a variety of ways, and that a memory characteristic is, therefore, not an essential feature of the floor covering 621. The floor covering 621 could be, for example, a sheet of spring, stainless, or mild steel laminated with a traction surface such as a rubber mat or applied epoxy material. Any material which remains elastic through the range of motion of the platform 607 can be used, however.

A sealing member 623 is positioned between the floor covering 621 and the side rails 605 of the base 601 to prevent debris from accumulating under the platform 607. The sealing member 623 may be of elastomeric construction or of a metal construction such as a stainless steel bellows which would be impervious to rodent damage. It should be noted, however, that there are no mechanical elements of the scale 600 positioned below the platform 607 and that, therefore, it is less critical to prevent dust and other small debris from entering the space beneath the platform 607 than was the case with livestock scale 59, for example.

Rigidly secured to the platform 607 are a pair of trusses 625 which serve to stiffen and support the platform 607. The trusses 625 are each positioned proximate a respective front edge 613 or rear edge 615 of the platform 607 and are spaced apart from one another to allow an animal (not shown) to pass therebetween. The trusses 625 each include a bottom rail 627 which is spaced above the floor covering 621 to allow manure an other debris to fall or be swept off of the platform 607. Each truss 625 is connected to the platform 607 by a hex head bolt 629 proximate the center of the platform 604, and by a respective eye bolt 631 proximate each end 609 and 611 of the platform 607. Tubular spacers 633 placed around the bolts 629 and 631 separate the bottom rails 627 from the floor covering 621.

The platform 607 and trusses 625 are suspended from an overhead framework 635 by four flexible members or cables 637, 639, 641 and 643, which are designated herein as the first, second, third and fourth cables, respectively. Each of the cables 637, 639, 641 and 643 is connected at a first end thereof to a respective one of the eye bolts 631. The first cable 637 is connected to the eye bolt 631 located proximate the juncture of the entrance end 609 and the front edge 613 of the platform 607. From the respective eye bolt 631, the first cable 637 extends upwardly and is entrained over a pair of pulleys 645 rotatably mounted on the framework 635. A second end of the first cable 637 is connected to a first end 647 of a load cell 649. Similarly, the second cable 639 is connected to the eye bolt 631 located proximate the juncture of the exit end 611 and the front edge 613 of the platform 607 and extends upwardly over a second pair of the pulleys 645 and is connected at its second end to a second end 651 of the load cell 649.

The third cable 641 is connected to the eye bolt 631 located proximate the juncture of the entrance end 609 and the rear edge 615 of the platform 607. The third cable 641 extends upwardly from the respective eye bolt 631 and is routed through a system of pulleys 645 such that the third cable 641 extends across the platform 607. A second end of the third cable 641 is fixedly attached to the first cable 637 by a crimp sleeve or other clamp 653 in such a manner that downward tension in the third cable 641 is transferred to the first cable 637 as downward tension. The entire weight of the entrance end 609 of the platform 607 thus acts on the first end 647 of the load cell 649 through the first cable 637.

Similarly, the fourth cable 643 is connected to the eye bolt 631 located proximate the juncture of the exit end 611 and the rear edge 615 of the platform 607 and extends upwardly through a system of pulleys 645, across the platform 607, and is fixedly attached at its second end to the second cable 639 by a clamp 653 in such a manner that downward tension in cable 643 is transferred to the second cable 639 as downward tension. The entire weight of the exit end 611 of the platform 607 thus acts on the second end 651 of the load cell 649 through the second cable 639.

Positioned proximate the first end 647 of the load cell 649 is a first lever arm 655. A first end 657 of the first lever arm 655 is pivotally connected to the framework 635 above the load cell 649. The first lever arm 655 extends downwardly past the load cell 649 to a second end 659 and is secured to the first cable 637 at a connection 661. The connection 661 allows the first lever arm 655 to move with the first cable 637 without causing slack to develop in the cable 637 on either side of the lever arm 655. Positioned outboard of the second end 659 of the first lever arm 655 and secured to the framework 635 is a first limit stop 663. Similarly, a second lever arm 665 is positioned proximate the second end 651 of the load cell 649. The second lever arm 665 includes a first end 667 pivotally connected to the framework 635 and extends downwardly to a second end 669. The second lever arm 665 is secured to the second cable 639 at a connection 671, which allows the second lever arm 665 to move with the second cable 639 without causing slack to develop in the cable 639 on either side of the lever arm 665. A second limit stop 673 is positioned outboard of the second end 669 of the second lever arm 665.

A tension spring 675 may be connected between the first lever arm 655 and the second lever arm 665 proximate their second ends 659 and 669, respectively. The spring 675 is further secured to the framework 635 and acts to pull the lever arms 655 and 665 toward a centered position. The spring 675 thus acts to center the scale 600 under no load conditions and may be used either supplementary to, or in place of, a floor covering 621 with a memory characteristic.

In use, an animal (not shown) initially steps onto the platform 607 proximate the entrance end 609 thereof. The animal's weight causes the entrance end 609 to pivot downwardly and creates additional tension in the first cable 637 and third cable 641. The tension in the first cable 637 acts on the first lever arm 655 and causes it to pivot off center until the second end 659 thereof contacts the first limit stop 663. With the first lever arm 655 thus engaged with the first limit stop 663, the load from the entrance end 609 of the platform 607 will not be transferred to the load cell 649, and the cell 649 will only read the gradually increasing load from the exit end 611 of the platform 607 acting through the second cable 639.

As the animal moves across the platform 607 toward the exit end 611, an increasing portion of its weight will be transferred to the exit end 611, and thereby to the second cable 639 and fourth cable 641. As the loading on the entrance and exit ends of the platform equalizes, the increased tension in the second cable 639 acts on the first lever arm 655 through the load cell 649 and pulls the second end 659 of the first lever arm 655 off of the first limit stop 663. With neither lever arm 655 or 665 engaged with its respective limit stop 663 or 673, the load cell 649 will be subjected to the animal's full weight, and an accurate weight reading will be measured by the load cell 649.

As the animal continues toward the exit end 611 of the platform 607, the tension in the second cable 639 continues to increase. Once the majority of the animal's weight has shifted to the exit end 611, the tension in the second cable 639 will pull the second lever arm 665 off center until the second end 669 thereof contacts the second limit stop 673. When this occurs, the load cell 649 will no longer be subjected to the weight from the exit end 611 of the platform 607, and will only read the gradually decreasing load from the entrance end 609 of the platform 607 acting through the first cable 637.

Once the animal steps off of the platform 607, the platform 607 will return to a level orientation and the lever arms 655 and 665 will return to center due to the action of the spring 675, flexible floor covering 621, and/or other centering means.

Figure 16:
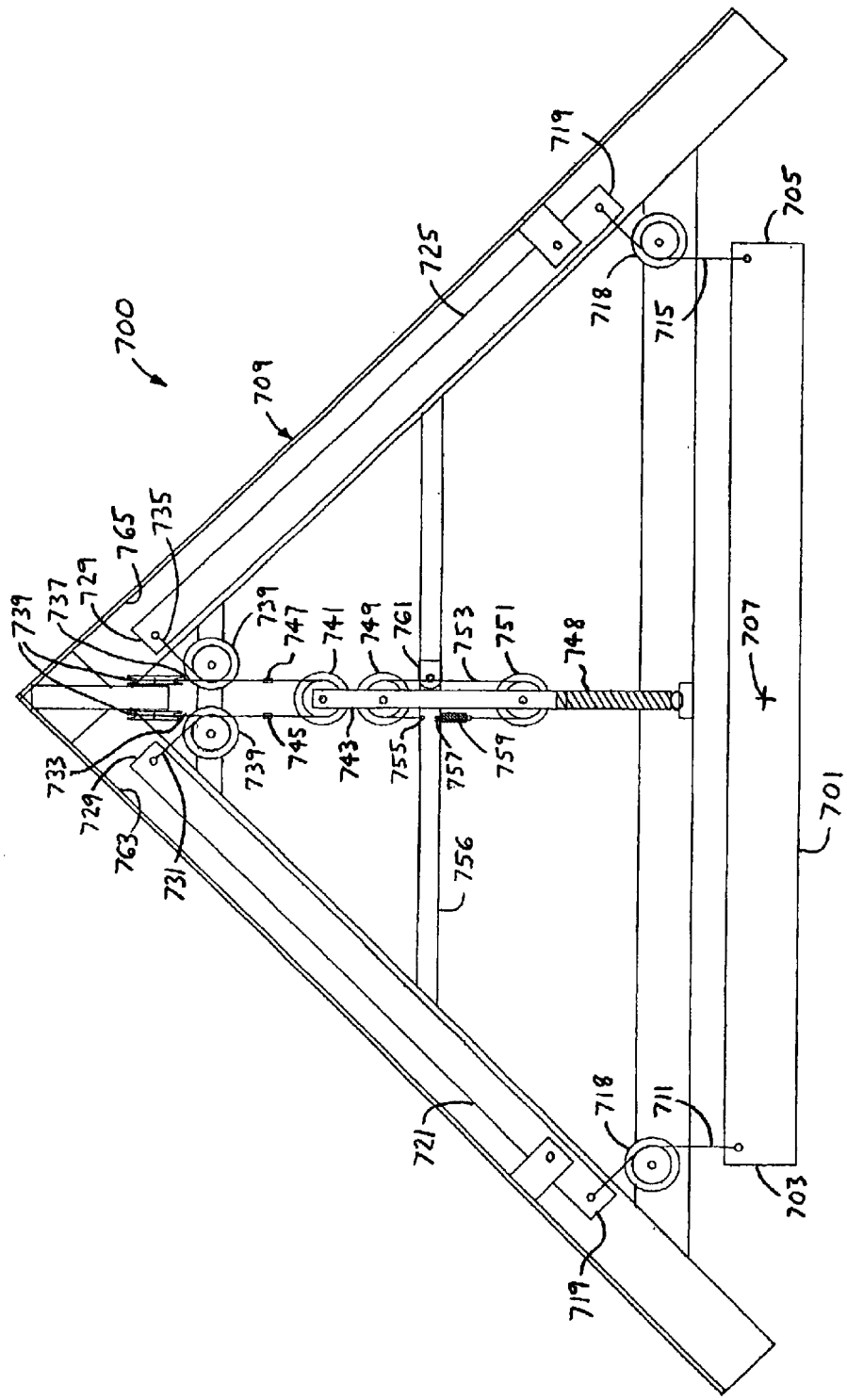
FIG. 16 is a partially schematic front side view of a livestock scale which represents a second alternative embodiment of the present invention.
Figure 17:
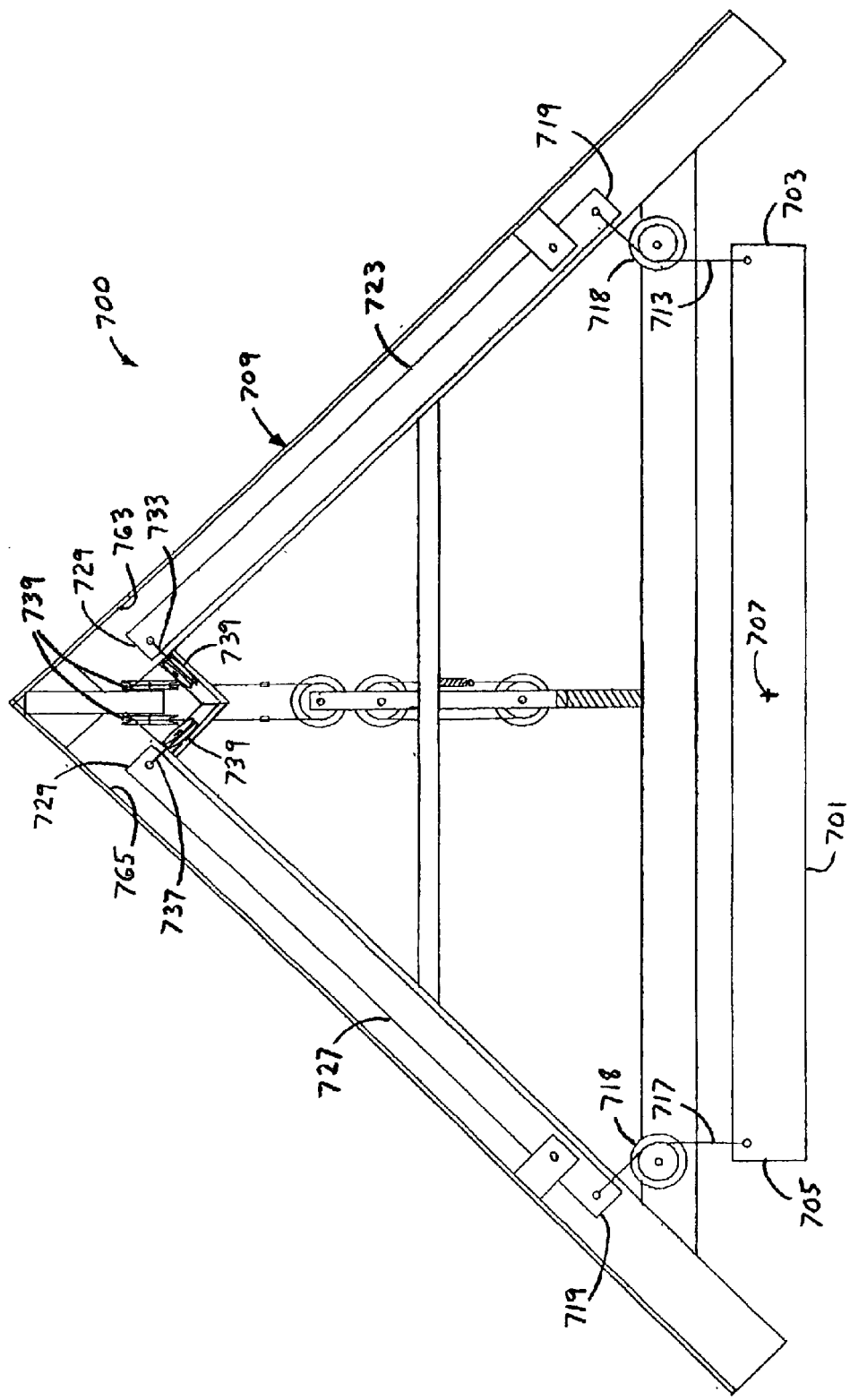
FIG. 17 is a partially schematic rear side view of the scale of FIG. 16.

Scale 700, shown schematically from the front side in FIG. 16 and from the rear side in FIG. 17 includes a platform 701 having an entrance end 703 and an exit end 705. The platform 701 is mounted for pivotal movement about an axis of rotation 707 midway between the entrance end 703 and the exit end 705. The structure for mounting the platform 701 is not shown, however it is to be understood that the platform 701 may be mounted in the same fashion as the platform 607 of the scale 600 previously described.

The platform 701 is supported from an overhead framework 709 by four lower cables or other lower flexible members 711, 713, 715 and 717. The lower cables 711, 713, 715 and 717 are each connected to the platform 701 proximate a respective corner of the platform 701. Lower cables 711 and 713 are connected to the platform 701 proximate the entrance end 703 and will, therefore, be referred to herein as entrance end lower cables. Lower cables 715 and 717 are connected to the platform 701 proximate the exit end 705 and will be referred to as exit end lower cables.

The entrance end lower cables 711 and 713 are each routed over a respective pulley 718 and connected to a first end 719 of a respective entrance end scale arm 721 or 723, which is, in turn, pivotally connected to the framework 709. The exit end lower cables 715 and 717 are each routed over a respective pulley 718 and connected to a first end 719 of a respective exit end scale arm 725 or 727, which are also pivotally connected to the framework 709.

Each scale arm 721, 723, 725 and 727 further includes a second end 729 to which is connected a respective upper cable 731, 733, 735 or 737, which are designated herein as the first, second, third and fourth upper cables, respectively. The upper cables 731, 733, 735 and 737 are each routed through a system of pulleys 739 rotatably mounted on the framework 709. The first and third upper cables 731 and 735 are connected together to form a single cable which is looped around an upper pulley 741 of a three pulley carrier 743. The second upper cable 733 is connected to the first upper cable 731 by a first clamp 745. Similarly, the fourth upper cable 737 is connected to the third upper cable 735 by a second clamp 747.

The three pulley carrier 743 is connected to the framework at its lower end by a tension spring 748 and further includes a middle pulley 749 and a lower pulley 751. A flexible fiber 753 is entrained around the middle pulley 749 and the lower pulley 751. A first end 755 of the fiber 753 is fixedly secured to a cross member 756 of the framework 709, whereas a second end 757 of the fiber 753 is secured to the same cross member 756 by a tension spring 759. A rotary encoder 761 mounted on the cross member 756 has a shaft in engagement with the fiber 753 such that movement of the fiber 753 causes rotation of the encoder shaft.

It should be noted that the three pulley carrier 743 simply acts to multiply the movement of the fibre 753 at the encoder 761, such that the motion of the fiber 753 is sufficient to actuate the encoder 761 while motion of the platform 701 is minimized. It is to be understood, therefore, that the three pulley carrier 743 is not an essential element of the invention. It is also to be understood that weighing devices other than the fiber 753 and encoder 761 could be used. For example a load cell (not shown) could be connected between the upper pulley 741 and the framework 709.

In use, when an animal (not shown) steps onto the platform 701 proximate its entrance end 703, the animal's weight causes the entrance end 703 to pivot downwardly and creates additional tension in the entrance end lower cables 711 and 713. This additional tension causes entrance end scale arms 721 and 723 to pivot off center until their second ends 729 contact the framework 709, portions of which thereby acts as first limit stops 763 and prevent further downward movement of the entrance end 703 of platform 701. As the second ends 729 of the entrance end scale arms 721 and 723 move toward the first limit stops 763, the first and second upper cables 731 and 733, respectively, are tensioned. The tension is transferred to the third and fourth upper cables 735 and 737, respectively, which pull the second ends 729 of the exit end scale arms 725 and 727 away from the framework 709. With the entrance end scale arms 721 and 723 thus engaged with the first limit stops 763, the load from the entrance end 703 of the platform 701 causes little upward movement of the three pulley carrier 743, and thus has little effect on the rotary encoder 761.

As the animal moves across the platform 701 toward the exit end 705, an increasing portion of its weight will be transferred to the exit end 705, and thereby to the exit end lower cables 715 and 717. As the loading on the entrance and exit ends of the platform equalizes, the increased tension in the exit end lower cables 715 and 717 will act on the exit end scale arms 725 and 727 causing them to pivot back toward center. As the exit end scale arms 725 and 727 pivot, tension is applied to the entrance end scale arms 721 and 723 through the upper cables 731, 733, 735 and 737, such that the second ends 729 of the entrance end scale arms 721 and 723 are pulled away from the first limit stops 763. With neither the entrance end scale arms 721 and 723 nor the exit end scale arms 725 and 727 engaged with the framework 709, the entire weight of the animal will act upwardly on the three pulley carrier 743. As the three pulley carrier 743 moves upwardly, the fiber 753 rotates the shaft of the encoder 761, causing the encoder 761 to produce a signal indicative of the animal's weight.

As the animal continues toward the exit end 705 of the platform 701, the tension in the exit end lower cables 715 and 717 continues to increase. Once the majority of the animal's weight has shifted to the exit end 705, the tension in the exit end lower cables 715 and 717 will pull the exit end scale arms 725 and 727 off center until the second ends 729 thereof contact respective portions of the framework 709 which act as second limit stop 765. When this occurs, the three pulley carrier will no longer be supporting the weight from the exit end 705 of the platform 701, and will begin to move downwardly such that the signal from the encoder will only represent the gradually decreasing load from the entrance end 703 of the platform 701.

It is to be understood that while certain forms of the present invention have been illustrated and described herein, it is not to be limited to the specific forms or arrangement of parts described and shown. For example, it is to be understood that the limit stops of each embodiment described herein could be moved to various points in the scale mechanism other than the locations shown. In the scale 700, for example, instead of being engaged by the second ends of the scale arms 721, 723, 725 and 727, the respective first and second limit stops could be engaged by the first ends of the scale arms 721, 723, 725 and 727, by the entrance and exit ends of the platform 701, or by limiting members connected to the upper cables 731, 733, 735 and 737.

It is also to be understood that various types of weighing devices can be used in each application or embodiment without deviating from the present invention and that the particular weighing devices disclosed are merely intended to be exemplary. For example, in those applications where a rotary encoder operated by a flexible fiber is disclosed, other types of weighing devices, such as mechanical scales (including balances and rotary dial scales with floating needles) or load cells (including multiple load cells) could be substituted. Furthermore, encoders are available which are actuated by drive mechanisms other than by a flexible fiber turning a shaft, and these other encoders can also be used interchangeably. Suitable encoders would include those with rack and pinion drives and those with frictional drives.

Scales using encoders, load cells, or other electronic weighing devices are easily coupled to other electronic devices, such as computers, to collect data and to control external and internal devices such as markers (for identifying those animals or other objects above or below a predetermined threshold weight), automatic sorting gates, etc. An encoder coupled with an electronic counter is an inexpensive apparatus for digitizing weight readings and can be used to record each object weight and to add or subtract that object weight from a total weight. The counter can, of course, also be used to count objects moving across the scale platform and to add or subtract the number from a total.

In the case of scales using mechanical balances, the balance poise can be set at a threshold weight such as a sorting weight for livestock. As each animal passes over the scale platform, the balance will provide an indication of which animals are over the sorting weight. The animals can then be sorted or culled according to weight. Similar devices can be used in truck scale applications to indicate which trucks are over prescribed weight limits. Movement of the balance may be used to operate counters, trip various controls such as mechanical or electronic sorting controls, trip signal lights, warning horns, marking devices, etc. Other scales, such as spring type scales, can also be pre-loaded to a given setting such that motion occurs only when weights over the pre-load setting are encountered.

It is further to be understood that in each embodiment disclosed herein, the designation of one end of the respective platform as an "entrance end" an the other end as an "exit end" is only intended to indicate the direction of movement of a load across the platform at any given time, and is not intended to limit the structure to movement in one particular direction. In some applications, it may be desirable for loads to move in both directions across the platform. For example, in a truck scale application, loaded vehicles could move in one direction across a platform and empty vehicles could cross in the opposite direction on the return trip. The weighing device could be programmed to add the weights of the loaded trucks moving in the forward direction and to subtract the tare weight of the empty trucks moving in the reverse direction to determine a total weight of material delivered.

Further still, it is to be understood that the platform (which can include a section of rail or track, a tube, or any structure across or through which an item to be weighed can be moved) can be of any length from very short to relatively long, and that the relative proportions of the platform are immaterial to the invention.

It is also to be understood that, in those embodiments where the platform is supported by cables or other flexible members, more or fewer cables than the four cables shown could be used. For example a scale having a pair of cables supporting the platform proximate its midpoint wherein the cables are connected to a load cell or other weighing device is foreseen by the inventor and intended to be within the scope of the present invention.

What is claimed is:

1. A scale comprising:
   a) a platform having an entrance end and an exit end, said platform being pivotal about a transverse axis between said entrance end and said exit end of said platform:
   b) a first limit stop engageable to limit downward movement of said entrance end of said platform;
   c) a second limit stop engageable to limit downward movement of said exit end of said platform; and
   d) a weighing device connected to said platform and operable to provide an indication of the weight of an object supported on said platform when neither of said first and second limit stops is engaged.

2. The scale as in claim 1 wherein said transverse axis is formed by a fulcrum about which said platform pivots and said weighing device is operatively connected to said fulcrum.

3. The scale as in claim 1 wherein said first and second limit stops are directly engageable by said platform.

4. The scale as in claim 1 and further including a tipping member having first and second ends, wherein said first end is connected to said entrance end of said platform, said second end is connected to said exit end of said platform, said tipping member is pivotably mounted for movement about a fulcrum, and said weighing device is operatively connected to said fulcrum.

5. The scale as in claim 4 wherein said first and second limit stops are engageable by said tipping member.

6. The scale as in claim 1 and further including a framework above said platform wherein:
   a) said weighing device comprises a load cell having first and second ends; and
   b) said platform is connected to said load cell by a plurality of flexible members engaged with said framework and supporting said platform, including;
      I) a first flexible member connected at a first end thereof to said platform proximate said entrance end, engaged with said framework, and at a second end thereof connected to said first end of said load cell; and
      II) a second flexible member connected at a first end thereof to said platform proximate said exit end, engaged with said framework, and at a second end thereof connected to said second end of said load cell.

7. The scale as in claim 6 and further including:
   a) a first lever arm having a first end pivotally connected to said framework and a second end engageable with said first limit stop, said first lever arm being connected to said first flexible member such that downward movement of said entrance end of said platform causes said first lever arm second end to move toward said first limit stop; and
   b) a second lever arm having a first end pivotally connected to said framework and a second end engageable with said second limit stop, said second lever arm being connected to said second flexible member such that downward movement of said exit end of said platform causes said second lever arm second end to move toward said second limit stop.

8. The scale as in claim 1 and further including a framework above said platform and wherein said platform is connected to said weighing device through first and second scale arms, each said scale arm having first and second ends and being pivotally connected to said framework between said first and second ends, said first end of said first scale arm being connected to said platform proximate said entrance end thereof, said first end of said second scale arm being connected to said platform proximate said exit end thereof, and said second ends of said first and second scale arms being operatively connected to said weighing device.

9. The scale as in claim 8 wherein said first and second limit stops are engageable with said first and second scale arms, respectively.

10. The scale as in claim 8 wherein:
    a) said first scale am, is connected to said platform by a first lower flexible member connected at a first end thereof to said platform proximate said entrance end and at a second end thereof to said first end of said first scale arm;
    b) said second scale arm is connected to said platform by a second lower flexible member connected at a first end thereof to said platform proximate said exit end and at a second end thereof to said first end of said second scale arm.

11. The scale as in claim 8 wherein said weighing device comprises a rotary encoder having a shaft rotatable by a flexible fiber connected to said second ends of said first and second scale arms.

12. The scale as in claim 11 wherein:
    a) said second end of said first scale arm is connected to said second end of said second scale arm by an upper flexible member;
    b) said upper flexible member is entrained around a first end pulley of a three pulley carrier;
    c) said three pulley carrier further includes a middle pulley and a second end pulley opposite said first end pulley; and
    d) said flexible fiber is entrained around said middle and second end pulleys and includes a first end fixedly secured to said framework and a second end connected to said framework by a tension spring.

13. The scale as in claim 1 and further including a base, wherein said platform is pivotally connected to said base by first and second platform extensions, said first platform extension having a first end hingedly connected to said base and a second end hingedly connected to said entrance end of said platform, and said second platform extension having a first end hingedly connected to said base and a second end hingedly connected to said exit end of said platform.

14. The scale as in claim 13 and further including a flexible floor covering overlaying said platform end said first and second platform extensions.

15. The scale as in claim 14 wherein said flexible floor covering has a memory characteristic allowing said flexible floor covering to urge said platform and said first and second platform extensions into generally planar alignment when no object to be weighed is positioned on said platform.

16. The scale as in claim 15 and further including a sealing member positioned between said flexible floor covering and said base.

17. A scale comprising:
    a) a platform having an entrance end and an exit end, said platform being pivotal about a transverse axis between said entrance end and said exit end of said platform;
    b) a framework above said platform;
    c) a load cell having first and second load cell ends;
    d) first and second flexible members moveably engaged with said framework and supporting said platform; said first flexible member having a first end connected to said platform proximate said entrance end, engaged with said framework, and having a second end connected to said first load cell end; said second flexible member having a first end connected to said platform proximate said exit end, engaged with said framework, and having a second end connected to said second load cell end;
    e) a first limit stop limiting downward movement of said entrance end of said platform; and
    f) a second limit stop limiting downward movement of said exit end of said platform.

18. The scale as in claim 17 wherein said first limit stop is engageable by a first limiting member connected to said first flexible member and said second limit stop is engageable by a second limiting member connected to said second flexible member.

19. The scale as in claim 17 and further including:
    a) a first lever arm having a first end pivotally connected to said framework and a second end engageable with said first limit stop, said first lever arm being connected to said first flexible member such that downward movement of said entrance end of said platform causes said first lever arm second end to move toward said first limit stop; and b) a second lever arm having a first end pivotally connected to said framework and a second end engageable with said second limit stop, said second lever arm being connected to said second flexible member such that downward movement of said exit end of said platform causes said second lever arm second end to move toward said second limit stop.

20. A scale comprising:

a) a platform having an entrance end and an exit end, said platform being pivotal about a transverse axis between said entrance end and said exit end of said platform;

b) a first limit stop limiting downward movement of said entrance end of said platform; and c) a second limit stop limiting downward movement of said exit end of said platform;

d) a framework above said platform;

e) a first scale arm having first and second ends and being pivotally connected to said framework between said first and second ends, said first end of said first scale arm being connected to said platform proximate said entrance end thereof;

f) a second scale arm having first and second ends and being pivotally connected to said framework between said first and second ends, said first end of said second scale arm being connected to said platform proximate said exit end thereof;

g) a flexible member connected between said second ends of said first and second seals arms;

h) a pulley rotatably engaged with said flexible member; and i) a weighing device connected to said pulley.

21. The scale as in claim 20 wherein said weighing device comprises a rotary encoder having a shaft rotatable by a flexible fiber connected between said pulley and said framework.

22. The scale as in claim 21 wherein:

a) said pulley is first end pulley of a three pulley carrier which further includes an middle pulley and a second end pulley opposite said first end pulley; and b) said flexible fiber is entrained around said middle and second end pulleys.

* * * * *

UNITED STATES PATENT AND TRADEMARK OFFICE
CERTIFICATE OF CORRECTION

PATENT NO. : 6,838,625 B2
DATED : January 4, 2005
INVENTOR(S) : Jerry L. Ostermann It is certified that error appears in the above-identified patent and that said Letters Patent is hereby corrected as shown below:

<u>Column 19,</u>
Line 56, the word "am" in the first line is corrected to read -- arm --.

<u>Column 20,</u>
Line 25, the word "end" in the second line is corrected to read -- and --.

Signed and Sealed this

Fifth Day of April, 2005

JON W. DUDAS
*Director of the United States Patent and Trademark Office*